April 7, 1925. Re. 16,041

B. S. AIKMAN

CONTROL SYSTEM FOR COMPRESSORS AND THE LIKE

Original Filed May 21, 1917 7 Sheets-Sheet 1

Inventor
Burton S. Aikman
By Brown Bottenhorn & Wenner

April 7, 1925. Re. 16,041

B. S. AIKMAN

CONTROL SYSTEM FOR COMPRESSORS AND THE LIKE

Original Filed May. 21, 1917 7 Sheets-Sheet 2

Inventor
Burton S. Aikman
By Brown Boettcher & Dienner

April 7, 1925. Re. 16,041

B. S. AIKMAN

CONTROL SYSTEM FOR COMPRESSORS AND THE LIKE

Original Filed May 21, 1917 7 Sheets-Sheet 3

Inventor
Burton S. Aikman
By Mason, Boettcher & Dienner

April 7, 1925. Re. 16,041

B. S. AIKMAN

CONTROL SYSTEM FOR COMPRESSORS AND THE LIKE

Original Filed May 21, 1917 7 Sheets-Sheet 4

Inventor
Burton S. Aikman
By Brown Dorsey & Denner

April 7, 1925. Re. 16,041

B. S. AIKMAN

CONTROL SYSTEM FOR COMPRESSORS AND THE LIKE

Original Filed May 21, 1917 7 Sheets-Sheet 5

Inventor
Burton S. Aikman
By Brown Bottner & Benner

April 7, 1925. Re. 16,041
B. S. AIKMAN
CONTROL SYSTEM FOR COMPRESSORS AND THE LIKE
Original Filed May 21, 1917 7 Sheets-Sheet 6
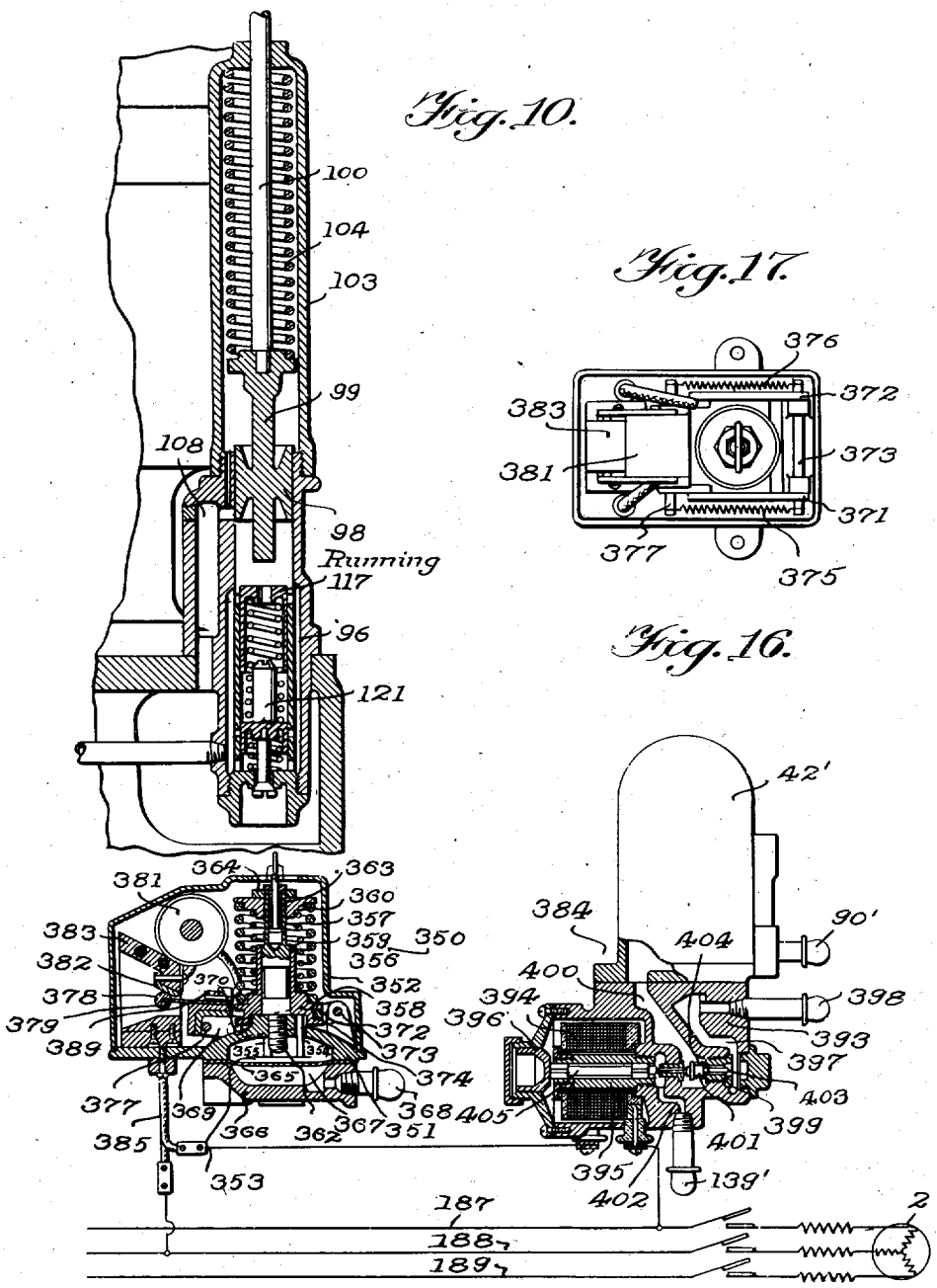
Inventor
Burton S. Aikman
By Brown, Boettcher & Dennis April 7, 1925.
Re. 16,041
B. S. AIKMAN
CONTROL SYSTEM FOR COMPRESSORS AND THE LIKE
Original Filed May 21, 1917 7 Sheets-Sheet 7
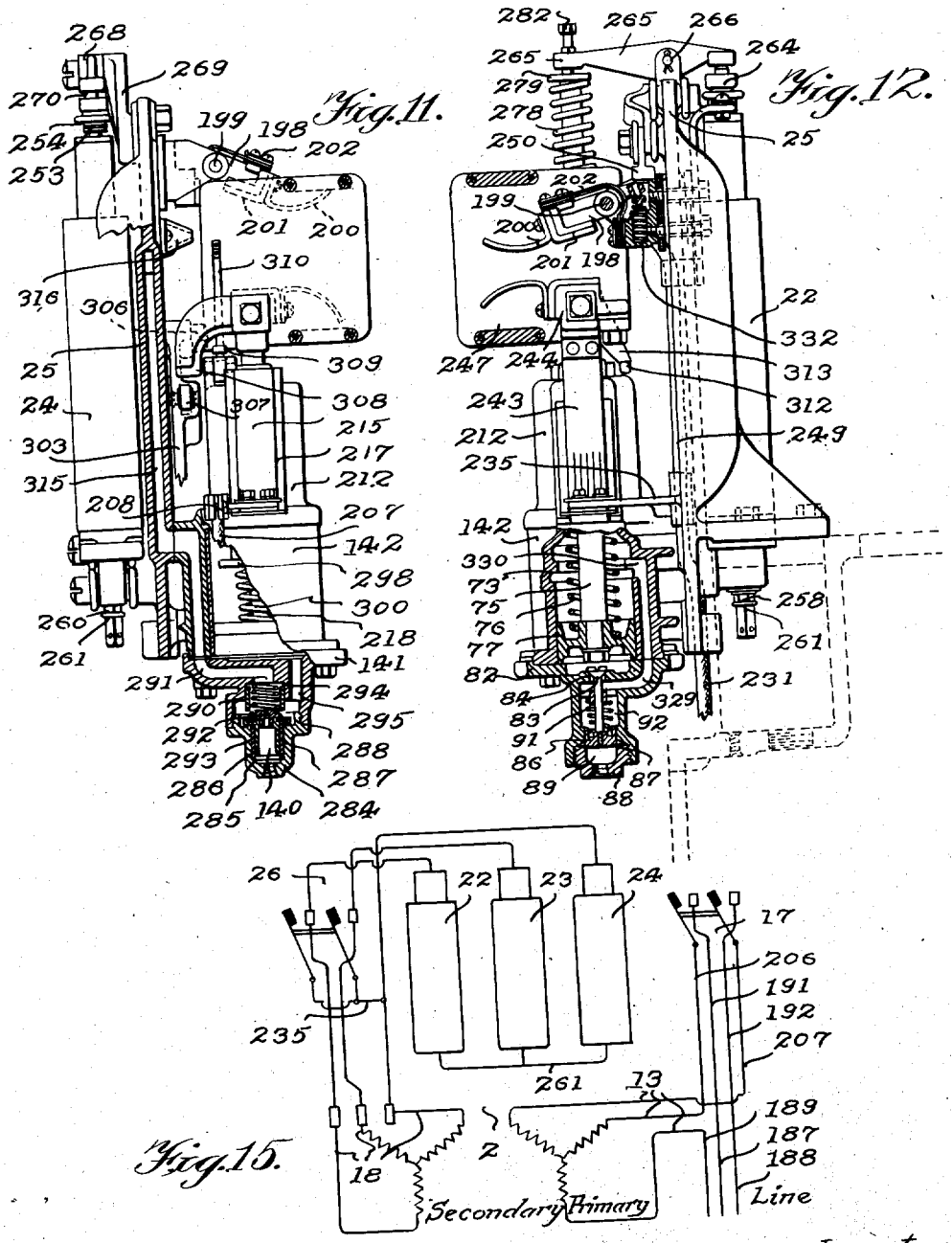
Inventor
Burton S. Aikman
By Brown, Boettcher & Dienner Reissued Apr. 7, 1925.

Re. 16,041

UNITED STATES PATENT OFFICE.

BURTON S. AIKMAN, OF WHITEFISH BAY, WISCONSIN, ASSIGNOR TO NATIONAL BRAKE & ELECTRIC COMPANY, OF MILWAUKEE, WISCONSIN, A CORPORATION OF WISCONSIN.

CONTROL SYSTEM FOR COMPRESSORS AND THE LIKE.

Original No. 1,400,133, dated December 13, 1921, Serial No. 169,997, filed May 21, 1917. Application for reissue filed December 10, 1923. Serial No. 679,810.

*To all whom it may concern:*

Be it known that I, BURTON S. AIKMAN, a citizen of the United States, residing at the village of Whitefish Bay, in the county of Milwaukee and State of Wisconsin, have invented a certain new and useful Improvement in Control Systems for Compressors and the like, of which the following is a full, clear, concise, and exact description, reference being had to the accompanying drawings, forming a part of this specification.

My invention relates to a system of control for air compressors and the like.

Due to the simplicity, safety and adaptability of compressed air it has come into very general use. It is particularly desirable for operating certain types of intermittently active apparatus which of necessity must be isolated and subject to infrequent attention or inspection.

Railway switching and interlocking plants, pumping plants and the like are instances of such installations.

The reliability of compressed air as an operating medium recommends it for some types of installation. To keep the over-all reliability of the plant at a maximum it is necessary to safe-guard the compressor and particularly the electric motor and other electrical equipment. It is better to prevent the motor and compressor from being started than to allow the same to start and to be damaged. The plant can be operated for a time on the air in the main reservoir even at reduced pressure while attention is given to the motor and the condition or obstruction removed.

My invention aims primarily to provide a starting and control system for motor driven compressors which controls automatic stopping and starting of the motor and loading and unloading of the compressor and which is particularly characterized by provision for safe-guarding the electrical apparatus as well as the compressor itself against damage.

There are two pieces of electrical apparatus which are to be protected, namely the motor and the starting resistance. Automatic electrical protection of these pieces would entail expensive apparatus too complicated and delicate for the attendants to operate or understand and which would not give as great a degree of protection as the device of my invention.

In carrying out the above I employ a main switch for connecting the motor primary circuit to the power main, with a suitable starting resistance in circuit either in the primary or secondary of the motor. This main switch is governed by an operating element which holds the switch closed for a predetermined time to start the motor. If some condition exists which would prevent the motor from starting and picking up speed such for instance as an open phase on a polyphase circuit, excessive mechanical friction, improper voltage or frequency, excessive load, open secondary, or any of the things which might occur, and the motor does not come up to speed in a predetermined time the main switch automatically opens. This is necessary because the starting resistance is not designed for continuous operation and if it is left in the circuit too long it will be overheated and damaged.

I provide a cut-out switch for the starting resistance and an operating element for the switch which depends upon the motor coming up to speed. For this purpose I employ a hydraulic system having a graduated orifice governing the escape of the liquid from the system at a predetermined rate and a pump operated in unison with the motor shaft for pumping liquid into the system in accordance with the speed of the motor. If the motor speeds up properly and exceeds a certain critical speed pressure accumulates in the hydraulic system and operates the cut-out switch. Operation of the cut-out switch locks the main switch in closed position. Further accumulation of pressure by the motor coming up to full speed operates a pressure controlled element that loads the compressor.

This hydraulic system becomes the controlling means for the motor and the compressor and continued operation of the motor and compressor depends upon maintenance of pressure in said system.

When the desired air pressure has been created in the main reservoir a suitable air governor causes the hydraulic system to be opened so that pressure escapes. This at once causes unloading of the compressor, opening of the starting cut-out switch and opening of the main switch in turn.

Upon lowering of the air pressure in the main reservoir the governor operates to initiate another starting and loading of the compressor for replenishing the air supply as above outlined.

Suitable apparatus may be employed for opening the hydraulic system upon the occurrence of any electrical or mechanical conditions that may be dangerous or undesirable.

This provides a control system which is more flexible and reliable than a system of fuses overload switch or the like, although my invention may be applied in conjunction with them. The device is a self contained plant complete in itself and not requiring a switch-board to be set up and connected up as would be necessary for mounting electrically controlled safety devices.

In developing the main idea above outlined I have found it necessary to produce a number of improvements in various parts of an automatic pumping plant or system and hence my invention has other more specific objects.

As an example of such further object it is the aim of my invention to put the pump and the starter system under the control of the lubricating system. A further aim of the invention is to provide improved means for controlling the system for cooling the compressor. Another aim is the provision of an improved blow-out for the main switch. A further aim is the provision of over-load control means for the system. Numerous aims and objects will be apparent from the following specification.

In the accompanying drawings which form a part of the present specification I have illustrated one embodiment in which my invention may appear.

Figure 1:
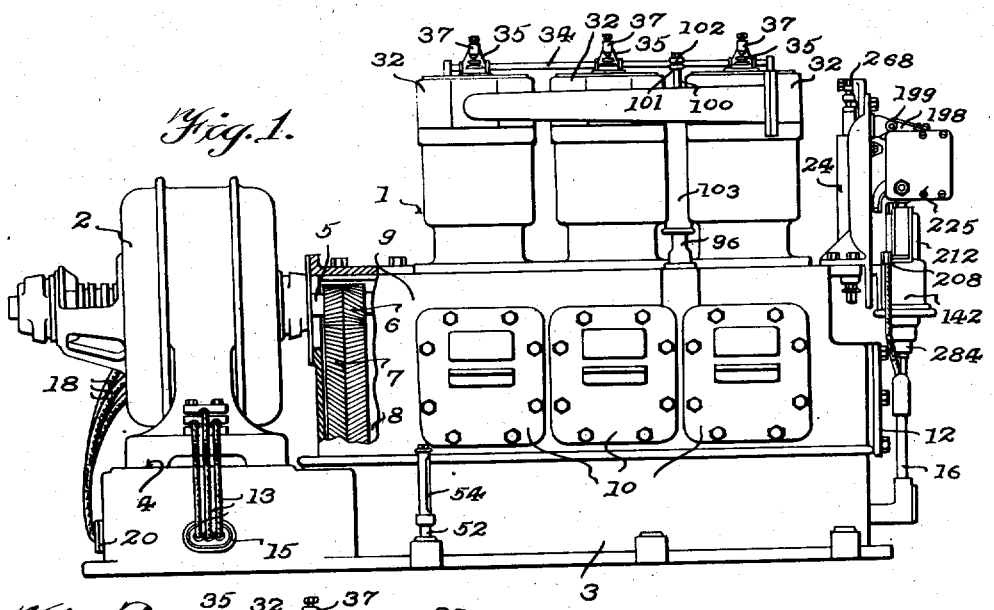
Figure 1 is a side elevation of a compressor and the operating and control mechanism therefor.
Figure 2:
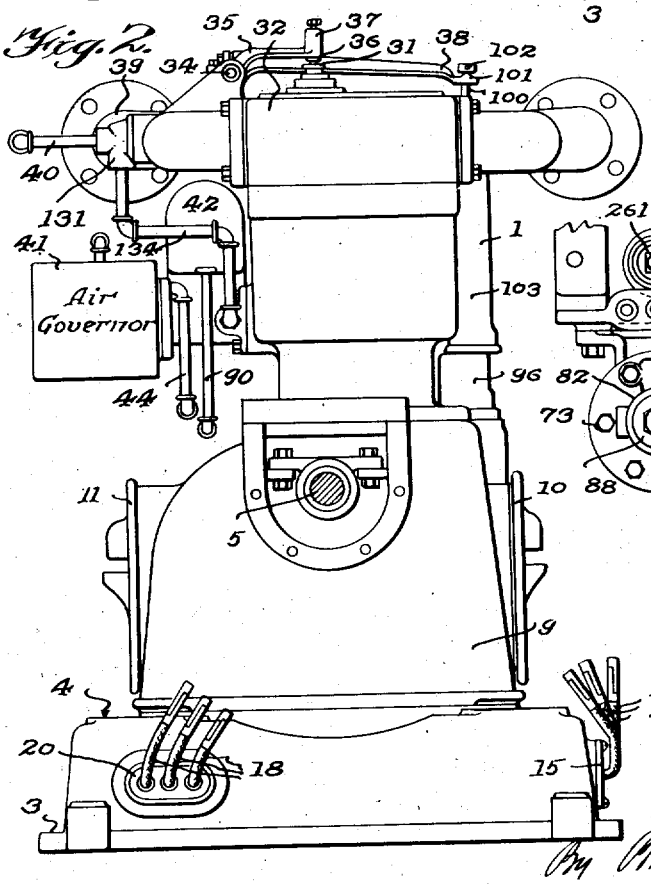
Fig. 2 is a rear end elevation of the same.
Figure 3:
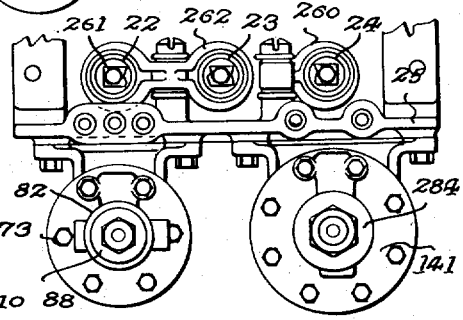
Fig. 3 is a bottom plan view of the switch board showing the main switch starting resistance switch and starting resistances.
Figure 4:
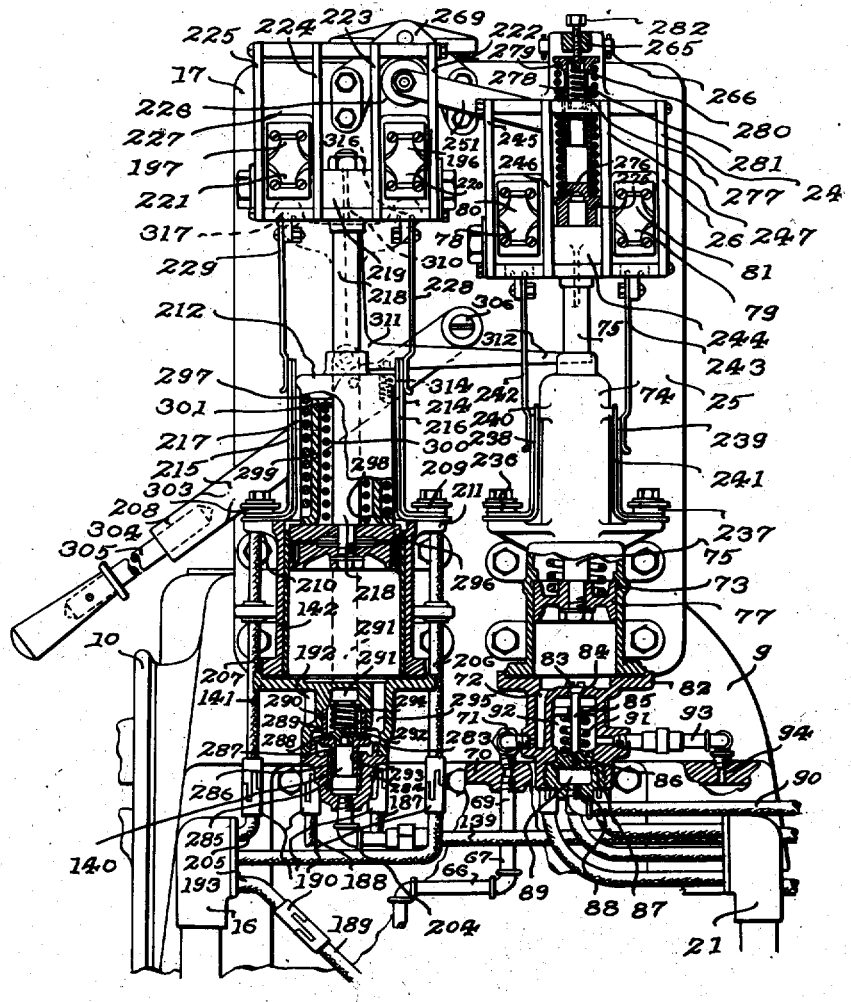
Figure 5:
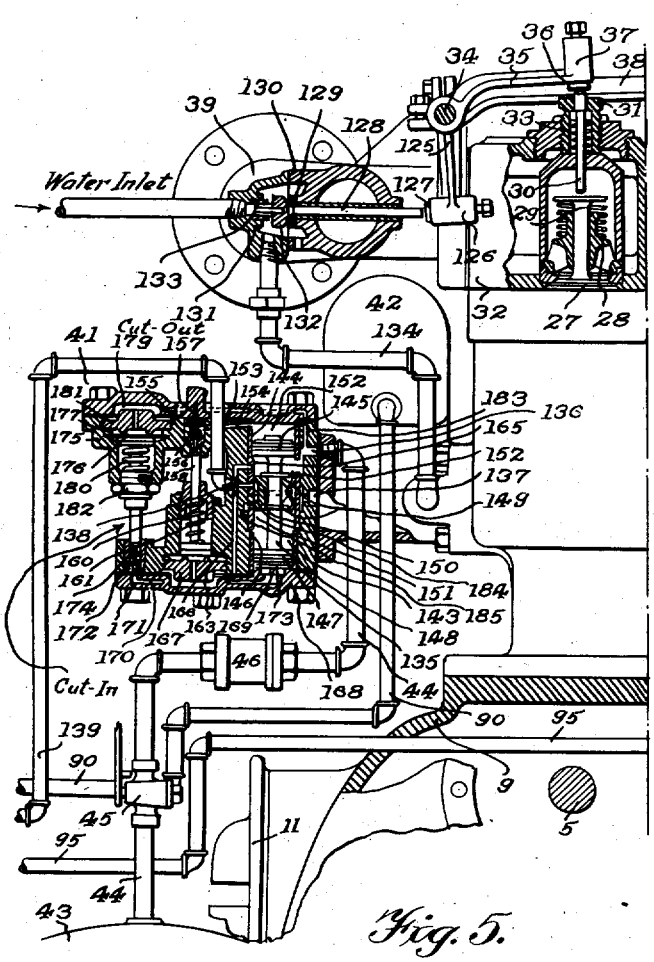
Figure 6:
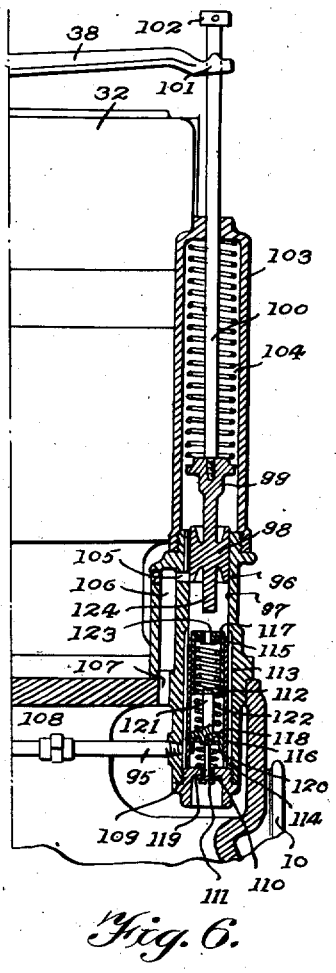
Figure 7:
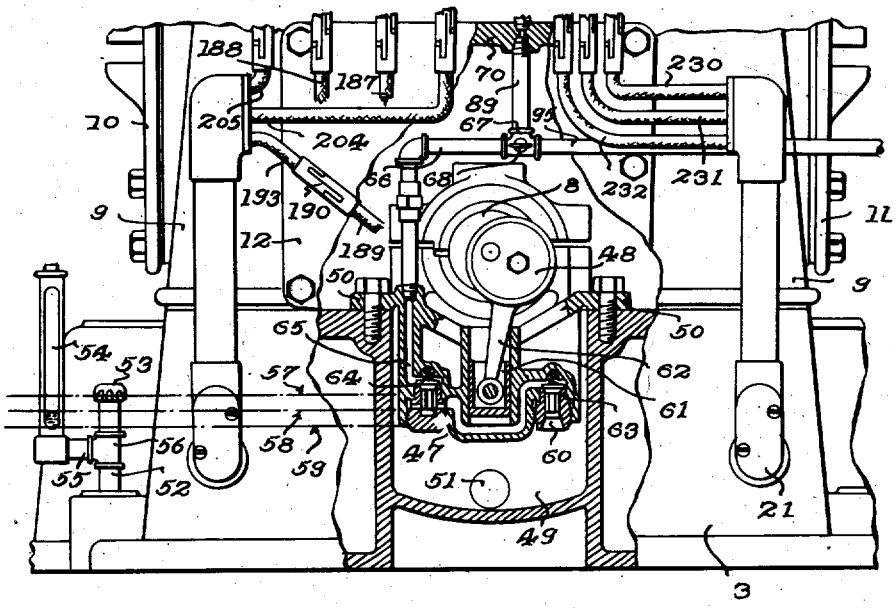

Figs. 4, 5, 6, and 7 are parts of a comprehensive diagram showing diagrammatically the connection and operative relation of the various parts. (Figs. 4, 5 and 6 are to be laid beside each other from left to right and Fig. 7 is to be laid below Fig. 4.)

Figure 14:
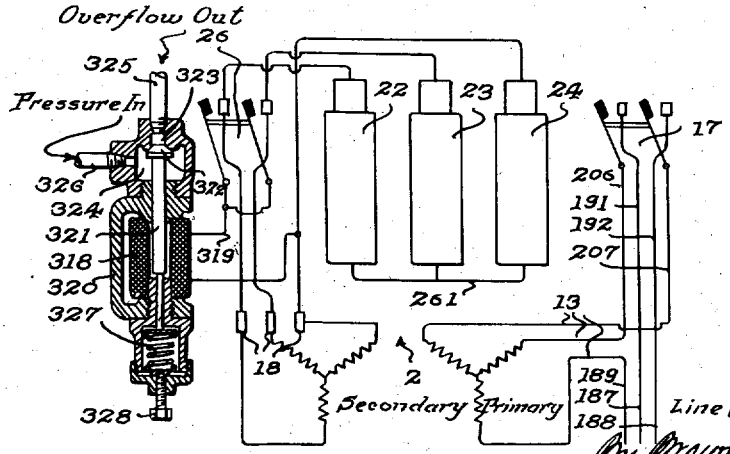
Figure 8:
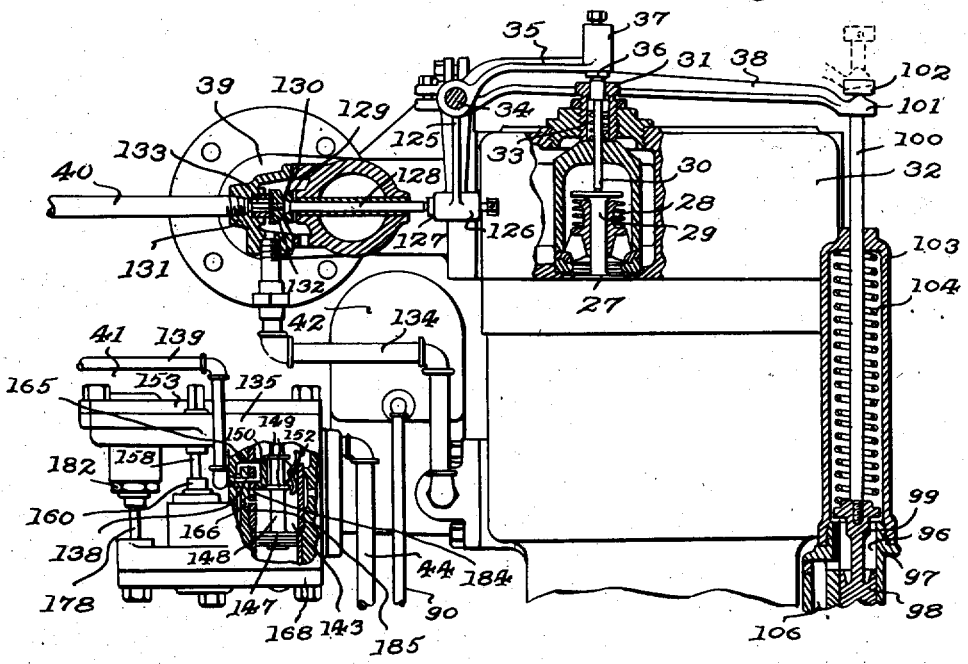
Figure 13:
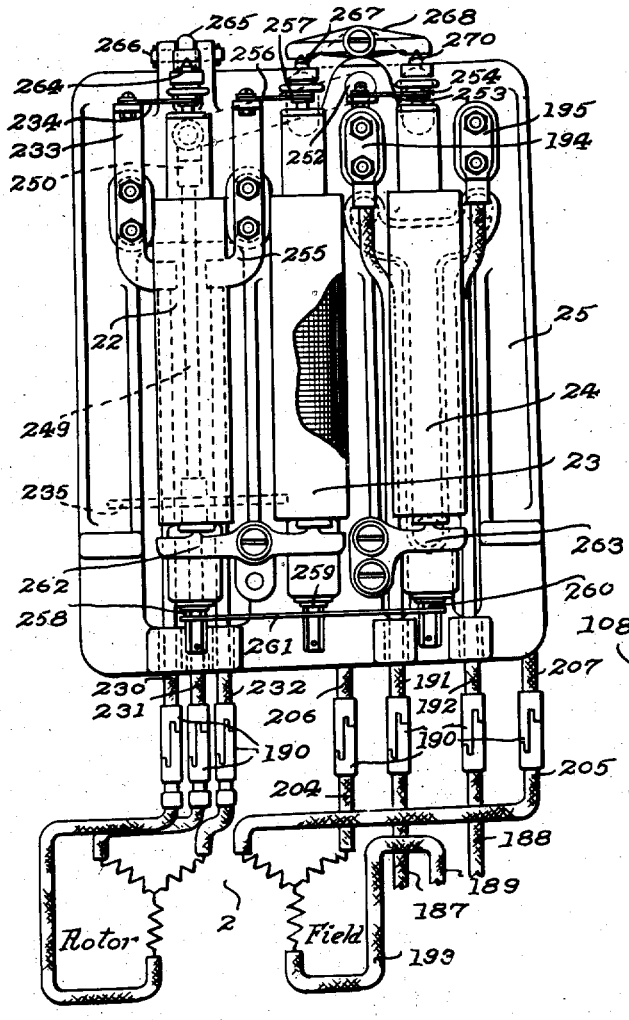
Figure 9:
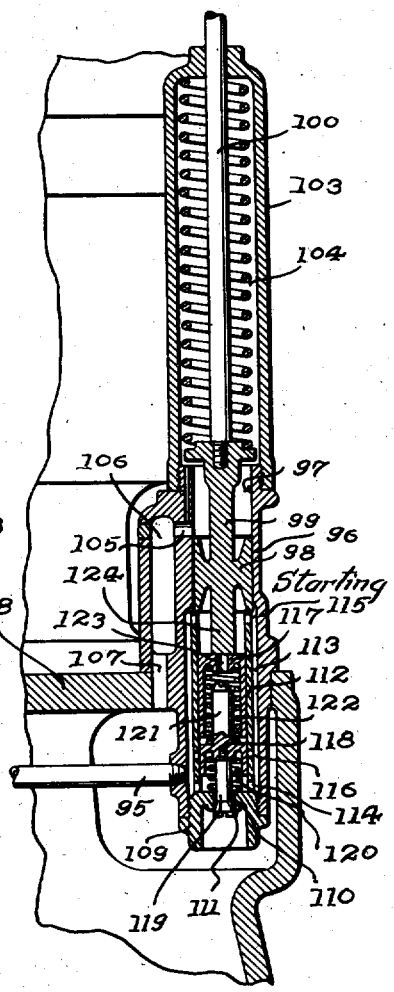

Fig. 4 shows in elevation the main switch and the starting resistance switch with the elements for operating the same;

Fig. 5 shows the pressure governor, the cooling water control and the suction valve control;

Fig. 6 shows the operating element for disabling the suction valve;

Fig. 7 shows the pump and connections in the motor base;

Fig. 8 is a view similar to Fig. 5, showing the governor in running position;

Fig. 9 is a section of the valve unloading cylinder when the same is in the starting position;

Fig. 10 is a view of the same in running position;

Fig. 11 is a right side elevation partly in section of the main switch;

Fig. 12 is a left side elevation partly in section of the starting resistance switch;

Fig. 13 is a rear elevation of the switch board showing the motor starting resistances and the connections;

Fig. 14 is a diagram of the electric circuit employing an overload protective device for unloading the compressor when the load upon the motor is excessive; and Fig. 15 is a diagram of the circuit connections without said protective device.

Fig. 16 is a diagram of a modified form of pressure controlling means; and

Fig. 17 is a plan view of the governor employed in the modification.

In carrying out my invention I have made use of the following general instrumentalities.

I employ a pressure controlled governor subject to the air pressure for initiating the necessary starting and stopping actions for cutting in and out the action of the driving motor and for initiating the steps of loading and unloading the compressor.

I employ a hydraulic pressure system for operating a switch which brings the motor up to speed, for loading the compressor and for controlling the flow of cooling water to the compressor jacket. This hydraulic system employs the oil used for lubrication as an operating medium, thus further safeguarding the mechanism.

I provide further an overload electrical relay governing the hydraulic system. Thus I provide a system in which loading of the compressor will not occur if any disarrangement of the electrical mechanism of the compressor or of the lubricating system should occur or if low voltage or frequency on the line or overload on the motor should occur.

The compressor 1 and motor 2 are mounted upon a common base 3. This base provides a pedestal 4 for the motor 2. The motor has a driving shaft 5 bearing a pinion 6 meshing with the gear 7 which gear is mounted on the end of the crank shaft 8 of the compressor. The base 3 supports a housing or crank casing 9 for inclosing the crank shaft and the gears and this housing is made tight to provide a suitable bath of oil for lubricating the gears, the crank-shaft and crank-pin, bearings, the pistons and cylinders and other bearings. Each side of the crank casing is accessible through the removable plates 10 and 11 and a removable plate 12 at the front or controller end permits access to the oil pump of the hydraulic system later to be described.

The motor 2 is of the wound rotor type. The primary leads 13 pass from the motor through a suitable conduit which enters the base 3 at the rear as is shown at 15 and emerges from the front of the base as shown at 16 where the leads are connected to the necessary feed wires through the main circuit controlling switch 17. The secondary leads 18 which connect with the rotor pass in through a suitable conduit entering the rear of the base at 20 and emerging from the front of the base at 21 from whence these leads emerge and are connected to the starting resistances 22, 23 and 24 which are mounted upon the back of the switch board 25. This switch board is mounted upon the compressor base 9 at the front of the same in a vertical position. A suitable short circuiting switch 26 for short-circuiting the secondary resistances is mounted upon the front of the switch-board 25 close to the main circuit controlling switch 17.

Each compressor cylinder is provided with one or more suction valves 27 that are normally held closed by means of springs 28 except when they are open during the suction stroke. The spring 28 engages the upper end of the stem 29 and tends to hold the valve 27 against its seat. Above the stem 29 and preferably axially in line with the same is provided a thrust rod or unloading rod 30 for each valve. The rod 30 passes through a bushing 31 which is mounted in the upper part of the hollow cylinder head 32 and is normally held in raised position by means of the spring 33 while the compressor is in the operating condition. A shaft 34 is pivoted slightly above the compressor cylinder and upon this shaft are clamped operating arms 35 bearing adjustable spring plungers 36 in a casing 37 at the outer end of the same for holding the suction valve 27 open for unloading the compressor. Each of the operating arms 35 by means of its yielding spring plunger 36 is able to unload the cooperating valve at the time that that valve is drawn down by the suction stroke of the corresponding piston. This is fully described in the co-pending application of W. I. Richards, Serial Number 804,958, now Patent Number 1,230,925. A single unloading arm 38 is connected to the unloading shaft 34 and serves to operate simultaneously all of the arms 35.

At the rear of the compressor is mounted a valve 39 controlling the admission of cooling water from the water inlet 40 to the jacket of the compressor cylinders.

A pressure controlled governor 41 which is provided with an auxiliary air reservoir 42 is also mounted upon the rear of the compressor (see Fig. 5). The governor 41 is connected by the necessary pipes to the various operating elements as will be described later.

A tank or reservoir 43 is connected to the discharge main of the compressor, which is not shown in the drawings, and is also connected by a pipe 44 through a cock 45 and a strainer 46 to the governor 41.

Within the crank case and connected to the end of the shaft 8 I have provided a small oil pump 47 which has an eccentric 48 connected to the end of the shaft 8. A small well 49 is formed near the end of the crank case and the pump 47 is lowered into the same and held upon the base 3 by means of suitable lugs 50 on the frame of the pump 47. As above explained the crank case contains a bath of oil and this oil flows into the well 49 through an opening 51. The oil is introduced through a pipe 52 the upper end of which is covered by the screw cap 53. A gage glass 54 is connected by means of a short piece of pipe 55 and a T 56 to the pipe 52 so that the gage glass 54 is in communication with the oil in the crank case. To fill the case the cap is unscrewed and oil is poured into the pipe 52 until the level of the same is brought to substantially the top of the pipe 52 as is shown by the dotted line 57. When the compressor is running the oil level drops to substantially the line 58 inasmuch as some of the oil is taken up by the pump and is distributed throughout the system, as will be explained later, and in view of the fact that some of the oil is splashed up and is running down the side walls and the like. The line 59 represents the danger level when the oil drops below the intake 60 of the pump 47.

Having now designated the main pieces or groups of apparatus I shall proceed to a detailed description of the various pieces of apparatus or groups of elements starting with the hydraulic oil system for operating the unloader and the starting resistance switch.

*Hydraulic system for operating the loader and starting resistance switch.*

The pump 47 has a suitable operating piston 61 connected by the rod 62 to the eccentric 48 which is mounted upon the end of the compressor shaft 8 and which is driven in unison therewith. The pump is provided with a suction valve 63 and discharge valve 64 of any approved type. The discharge port 65 of the pump 47 is connected to the hydraulic main 66. A fitting 67 having a graduated discharge orifice 68 which orifice is adjustable to vary the rate of discharge therethrough is connected in the hydaulic main 66 at any convenient point where the discharge from the orifice will flow back into the crank-case. The pipe 69 connected to an opening in the wall 70 of the crank case housing communicates through a separable fitting 71 to the hydraulic inlet port 72 of the switch-operating cylinder 73 for the starting resistance switch 26. The cylinder 73 is removably mounted upon the face of the switch-board 25. The upper end of the cylinder 73 is provided with a housing 74 through the upper end of which the piston rod 75 projects and within which is inclosed a spring 76 which tends to move the piston 77 to the lowermost position as is shown in Fig. 12. When the plunger 75 is raised to its uppermost position, it short-circuits the starting resistances 22, 23 and 24 in a manner which will be described in detail later. Suffice it to say that the movable contacts 78 and 79 will be closed against the stationary contacts 80 and 81, thus placing the motor 2 directly across the power leads for full speed, full load operation. The cylinder 73 is provided with a separable head 82 bearing a relief valve 83 which normally closes a port 84 of sufficient size and capacity to relieve the pressure of oil within the cylinder when the valve is opened but not so great as to drain the cylinder at once. The valve 83 has a stem 85 which is connected to a plunger 86 resting upon a flexible diaphragm 87 which is held in place by a recessed plug 88, the recess or chamber 89 of which is connected to a pipe 90 that connects the recess or chamber to the auxiliary air reservoir 42. A spring 91 normally holds the valve 83 upon its seat so that oil pumped into the cylinder 73 tends to raise the piston 77. The chamber 92 which is formed below the valve 83 and above the diaphragm 87 is connected by a separable pipe 93 to an opening 94 in the top of the crank case 9. Thus oil that is discharged through the valve port 84 is returned to the interior of the crank case. The piston 77 when it is at the top of its stroke rests against a shoulder formed at the upper end of the cylinder bore so that the pressure of the fluid upon the piston 77 is mainly taken up at this point and does not injure the contacts 201 and 244. Any of the oil which leaks past the piston 77 passes out the overflow 330 through the passage 329 and back to the crank case. This passageway at the same time permits of rapid return of the piston 77 since some of the oil in passing out of the exhaust port 84 will be projected through the passageway 329 and overflow 330 back into the cylinder on top of the piston 77.

The hydraulic main 66 is connected by a pipe 95 to the unloading cylinder 96 for unloading the valves of the compressor. The cylinder 96 is in fact a compound cylinder comprising the main bore 97 within which plays the piston 98, this piston being connected by a stem 99 to a piston rod 100. The upper end of the piston rod 100 passes through the end of the operating arm 38 as is shown at 101 having a collar 102 adapted to bear upon the end 101. The upper end of the cylinder 96 is covered by a housing 103 which incloses a relatively stiff spring 104, this spring being compressed between the upper end of the piston stem 99 and the top of the housing 103 so as to pull the rod 100 and the unloading arm 38 down. The function of this spring is to unload the compressor except when suitable fluid pressure is maintained within the cylinder bore 97.

Adjacent its upper end the cylinder bore 97 is provided with an escapement or release port 105 which is adapted to be uncovered when the piston 98 is moved to its uppermost position. The escapement or release port 105 communicates by means of a passage 106 with an opening 107 in the top of the crank chamber 108 upon which the cylinder 96 is mounted. The lower end of the cylinder 96 projects down into the crank case and is closed off by the cylinder head 109 which contains a valve port 110 normally closed by a valve 111. The cylinder 96 is provided with a liner or auxiliary cylinder 112 mounted upon the inside of the head 109 axially in line with the bore 97. The cylinder 96 is counterbored as is shown at 113 to provide a passageway around the outside of the auxiliary cylinder 112, this passageway 113 being in communication with the pipe 95 and communicating with the interior of the auxiliary cylinder 112 through three sets of ports, namely the ports 114 adjacent the cylinder head 109 at the lower end of the auxiliary cylinder 112, the ports 115 at the opposite end of the cylinder 112, and the intermediate ports 116.

The auxiliary cylinder 112 is provided with two pistons 117 and 118, slidable within the bore of the cylinder. The valve 111 has a stem 119 which is connected to the lower piston 118. A spring 120 surrounds the valve stem 119 and tends to force the piston 118 upward thereby holding the valve 111 over the port 110 in closed position. When the piston 118 is moved to its uppermost position as is shown in Fig. 9 this piston covers and closes off the ports 116 in the side walls of the cylinder 112. The lower piston 118 is provided with a stem 121 which projects upwardly and serves as a guide for a spring 122 which bears against the lower side of the upper piston 117 tending to separate the pistons 117 and 118. A valve port 123 through the piston 117 is closed off by the projecting stem 124 secured to the piston 98 that moves in the main bore 97 when the mechanism is at rest.

As oil is pumped into the hydraulic main 66 when the motor is first started, a certain part of the same escapes through the graduated orifice 68, the remainder passing through the pipes 69 and 95 to the switch operating and the compressor loading cylinders 73 and 96 respectively.

A certain relation exists between the starting switch operating cylinder and the unloader operating cylinder which is essential to the proper operation of the device and for the purpose of bringing out this relation I shall now describe the operation of this much of the machine.

*Operation of the starting resistance switch, controlling mechanism and of the unloader mechanism.*

The proportion of the spring strength for the switch operating cylinder with respect to the spring strength of the unloading mechanism operating cylinder 96 is such that for the same oil pressure in both of these cylinders, the spring 76 will be compressed before the spring 104 is compressed. That is to say the oil pressure which will be sufficient to move the piston 77 against the spring 76 will be insufficient to move the piston 98 against the spring 104. As oil is forced into the main 66 by operation of the pump 47 and as the speed of the driving motor increases the oil pressure in the main 66 and connected conduits will rise until such a pressure is obtained where the piston 77 begins to move upward and finally this piston is moved upward to such an extent that the switch contacts 78 and 79 will be brought against the stationary contacts 80 and 81 and the starting resistance cut out of the circuit. It can be seen that a predetermined speed is necessary before the short circuiting switch will be operated because of the escapement of pressure through the graduated orifice 68. As the speed of the motor increases after cutting out the starting resistance the pressure will rise higher in the system and at full speed will reach a pressure sufficient to move the piston 98 against the spring 104. As previously explained the spring 104 normally holds the operating arm 38 of the unloading device in its lower position so that the suction valve 27 is held off of its seat. The oil under pressure enters through the pipe 95 into the counterbore 113 and from there passes through the upper port 115 to the interior of the auxiliary cylinder 112 forcing the piston 98 upward. As the piston 98 rises the projecting stem 124 uncovers the port 123 in the top of the upper auxiliary piston 117 filling the space between the two auxiliary pistons 117 and 118 with oil thus equalizing the fluid pressure upon both sides of the piston 117. At the same time oil enters the bottom of the auxiliary cylinder through the lower ports 114 thereby equalizing the pressures upon both sides of the lower auxiliary piston 118 and hence the springs 120 and 122 of the two auxiliary pistons are free to operate, the first mentioned spring 120 serving to keep the valve 111 closed and the second spring 122 tending to cause the upper auxiliary piston 117 to rise in the cylinder 112.

When the main piston 98 has been forced up to the point where it uncovers the relief port 105 any further oil which is pumped into the cylinder will escape into the passage 106 through the passage 107 back to the crank case. When the piston 98 is in the position described the operating arm 38 will have been permitted under the influence of the springs 33 to be raised to such a position that the suction valves 27 are free to function in their usual manner.

The piston 98 with its spring 104 performs a dual function. The spring 104 tends primarily to lower the rod 100 and pull down the unloader lever 38 for opening the inlet valves of the compressor. The primary purpose of the piston 98 is to overcome the spring 104, lift the rod 100 and thereby cause loading of the compressor. But by means of the overrun port 105 in the wall of the cylinder, the spring 104 and piston 98 perform the important function of a bypass or loaded relief valve, which serves as a pressure maintaining valve, for retaining sufficient pressure in the hydraulic system to insure that first the switch will be kept closed and second that the unloader will be kept inactive so long as the predetermined speed is maintained and the feeding of oil otherwise satisfactorily maintained. Thus the leakage port 68 insures that the desired hydraulic pressure will not be built up until the predetermined speed of the compressor is attained and the piston 98 and port 105 insure that no more than a desired operating pressure will be retained for all higher speeds.

The leakage port 68 is in constant communication with the unloader cylinder and tends to deplete the pressure, but during normal compressor operation the pump 47 maintains the pressure of oil in the hydraulic system. However, as explained hereafter I do not depend upon this port alone to secure unloading. In addition to this constantly open and relatively small sized exhaust port 68, I provide a larger exhaust valve 111, as I shall describe later, for securing a quick release of pressure. I believe that the use of a quick release valve in a fluid pressure unloader is broadly new.

As will be seen from Figs. 6 and 10 after the unloading mechanism has been operated to put the suction valves in operating position and the compressor is running the piston 98 remains at a distance above the upper auxiliary piston 117 in the position determined by the port 105. The auxiliary piston 117 has been raised by its spring 122 into the position shown in this figure and the space between the upper auxiliary piston 117 and the lower auxiliary piston 118 is filled with the liquid under pressure.

Raising the operating arm 38 of the unloading mechanism serves to open the valve 39 which is connected in the cooling water system. An adjustable arm 125 is mounted upon the unloading shaft 34 and carries at its outer end 126 an adjustable spring plunger 127 which bears against the valve operating rod 128 provided at its outer end with a piston member 129. The piston member 129 bears against a diaphragm 130 which closes off one side of the valve body 131. A valve member 132 is guided to cover and uncover the ports 133 when the operating rod 128 is moved in or out. The valve body 131 has an outlet port communicating with the pipe 134 that leads to the cooling jacket of the cylinders. It can be seen that as the operating arm 38 of the unloading mechanism is raised by the springs 33 the valve member 132 will be released from the seat at the port 133 and the pressure of the water will open the valve and permit the cooling water to flow through the cylinders. The valve member 39 permits cooling water to enter the jacket as long as the unloading device permits the valve 27 to function.

Assume that the operation of the compressor has raised the air pressure in the main tank 43 to the desired point and that the air governor 41 operates as will be described later to stop the operation of the compressor.

When the air pressure in the main tank 43 reaches the desired point air under pressure will be admitted from the auxiliary reservoir 42 to the pipe 90 from whence it flows into the chamber 89 raising the diaphragm 87 thereby opening the valve 83. When the valve 83 is opened the liquid under pressure escapes through the port 84 to the discharge pipe 93 and back to the crank case. This release of pressure is gradual and the first consequence of the same is that the spring 104 begins to force the piston 98 of the unloading cylinder downward. The piston 98 will oscillate slightly with the strokes of the pump 47 but as the oil escapes through the port 84 the stem 124 of the piston 98 will finally strike the top of the auxiliary piston 117 thus closing off the port 123 in the top of that piston, trapping the oil between the upper piston 117 and the lower piston 118 and as the pressure is further reduced the spring 104 will exert its pressure against the upper piston 117 and the piston 117 in turn transmits the pressure to the lower piston 118 through the medium of the trapped oil between these parts thus forcing the lower piston 118 downward and opening the valve 111 thereby permitting the oil within the cylinder 96 to escape rapidly through the ports 114 and through the port 110. As the lower piston 118 is thrust downward it uncovers the intermediate ports 116 and permits the oil to escape from between the two pistons and finally permits the valve 111 to close and the parts to assume the position shown in Fig. 9.

Now, it will be apparent that the organization comprising valve 111 and its connected piston 118, together with the cooperating cylinder, cylinder ports and the intermediate piston 117, constitutes a quick release valve operating upon a declining pressure in the hydraulic system to permit rapid and complete evacuation of pressure in the system so that unloading may be positively secured and opening of the resistance control switch and the main switch be invariably accomplished when the hydraulic pressure declines to a predetermined minimum. It is to be particularly noted that this organization of elements does not operate the same upon a rising or increasing pressure. Then no release of pressure should occur, and none does occur.

The motor 2 during normal operation maintains a substantially constant speed so that very little variation in pressure in the hydraulic system occurs. Such minor variations as do occur are absorbed by the lost motion of the piston 98 and port 105 with respect to each other. That is to say for slightly higher speeds the port 105 is opened more and for lower speeds it is further closed. Hence the quick release device may be made highly sensitive to trip out sharply and promptly upon the decline of pressure in the hydraulic system below that corresponding to the required speed.

After the unloading mechanism has thus been operated to unload the valves 27 the pressure of the oil in the hydraulic main and connected parts will drop to such a point that the spring 76 of the switch operating cylinder 73 will overcome the oil pressure and the starting resistance short circuiting switch will be opened. As the piston rod 75 drops downward it trips out the main switch 17 by means of a mechanical release as will be described later.

It will be noted that due to the proportions of the spring strength of the cylinders 73 and 96 the starting resistance will be short circuited before the compressor is loaded and the compressor will be unloaded before the switch is opened.

The operation of the hydraulic system in connection with the stopping and starting mechanism has been set forth sufficiently so that certain advantages of this type of control and of the particular combination of elements is now apparent. If through an accidental leak in any part of the oil system or a gradual using up of the oil in the compressor it should occur that the oil should drop down to the danger level represented by the line 59, the compressor could not be loaded. This is apparent because the pump would be unable to draw oil after the level of the oil fell below the suction intake 60. There might be sufficient oil to close the resistance short circuiting switch 26 but in the event of any shortage of oil whatsoever the compressor will not be loaded. When the compressor reaches full or normal speed it will lower the level of the oil further by splashing and by carrying more on the gears and soon draws the level so low that the oil pump draws air. This immediately results in a drop pressure in the hydraulic main. The first consequence of this reduction in pressure in the hydraulic main is that the spring 104 begins to force the piston 98 of the unloading cylinder downward causing the piston 98 to strike the auxiliary piston 117 and, as hereinabove described, force the valve 111 off of its seat and open the port 110. Before the valve 111 has been again seated sufficient oil has escaped from the hydraulic main to effect the opening of the main switch. However the machinery will not be running dry when the oil has reached the danger level as there is still ample to protect the machinery against damage. The operator or attendant is warned of the danger by opening of the main switch and refusal of the compressor to start automatically. Inspection of the gage-glass 54 will reveal the cause of the difficulty. If any rupture of the oil conveying pipe or of the oil containing chamber should occur or in the event that the machine is not running at proper speed the same condition of control will prevail. If the loss of oil is sufficient to rob the switch operating cylinder of oil the main switch will automatically open within a very short time after it is closed by leakage of the air from the auxiliary reservoir as will be described later. The hydraulic system and connected parts is primarily a protecting system. If the motor does not come up to speed the pump will fail to accumulate pressure due to the escapement of oil out of the graduated orifice. The starting resistance cut-out switch will not close and as a consequence the main switch will open. The speed at which the system accumulates pressure may be nicely predetermined by adjustment of the size of the orifice. Any condition electrical or mechanical which would prevent the motor from properly starting or running at full speed will act upon the hydraulic system and it in turn will protect the apparatus.

I shall now describe the operation of the automatic governor 41.

*Automatic air governor.*

The automatic air governor 41 is of a type heretofore known and will not be described in detail except where the same is necessary to set out the function of the same in the present system. Any other form of governor which is capable of closing the main switch when the pressure in the main reservoir 43 has dropped down to a pre-determined cut-in-pressure and which would operate to open the valve 83 when the pressure in the main reservoir had been raised to a certain pre-determined cut-out pressure, might be used. The governor 41 comprises a main body portion 135 having an inlet port 136 connected by the pipe 44 to the main reservoir 43. The main body is provided with two outlet ports, one of which 137 is connected to the auxiliary reservoir 42, and the other 138 is connected by means of a pipe 139 to a valve operating cylinder 140 mounted in the cylinder head 141 of the main switch operating cylinder 142. The main body of the governor 135 has an open central passage 143 which is provided at its upper end with a cylinder bore 144 within which is fitted a sliding piston 145. At the other end of the central bore there is formed a cylinder bore 146 within which is slidably mounted a piston 147, the piston 147 being of a smaller diameter than the piston 145. These two pistons 145 and 147 are connected together by a stem or rod 148 which has a pair of collars 149 between which is mounted a slide valve 150 which valve is pressed against a suitable valve surface 151 by means of a spring 152. The space 143 between the pistons 145 and 147 communicates through the port 136 with the pipe 44 connected to the main reservoir. The space 152 between the piston 145 and the cylinder head 153 communicates by way of a port 154 with the cut-out valve 155; this valve 155 normally closes against its seat, 156 being held in place by a suitable spring 157. The valve 155 is provided with means for opening the same, this means consisting of a plunger rod 158 connected to a piston 159 and guided in a suitable nut 160. A spring 161 the tension of which may be adjusted by the nut 160 presses the piston 159 against a diaphragm 162 tending to hold the plunger rod 158 away from the valve 155 thus allowing the same to close. Upon the opposite side of the diaphragm 162 is provided a chamber 163 to which compressed air may be admitted through the port 165 and passage 166. A suitable supporting block 167 holds the diaphragm 162 in place and prevents damage to the same from tension of the spring 161.

The space between the piston 147 and the cylinder head 168 is connected through a valve port 169 and a passageway 170 with the valve port 171 which is controlled by the cut-in valve 172. The piston 147 has a boss or projection 173 which is adapted to cover the valve port 169 and to close off the same when the pistons 145 and 147 are moved to the lowermost position as is indicated in Fig. 5.

The valve 172 which is termed the "cut-in" valve is normally held open by the spring 174. An operating cylinder 175 which contains a piston 176 and diaphragm 177 is provided with an operating rod or plunger 178 for pressing the valve 172 upon its seat. A chamber 179 is provided on the other side of the diaphragm 177 for operating the plunger and rod to close the valve 172. A suitable spring 180 presses the diaphragm against the supporting block 181 and prevents the valve 172 from being closed until a suitable pressure is created in the chamber 179. The strength of the spring 180 is adjustable by means of the nut 182.

The chamber 179 is always in communication with the pressure in the main reservoir 43 by way of the passage 183 which branches off from the passage 136. The passage 137 communicates with the interior of the cylinder space 143 by means of the two valve ports 184 and 185. These two ports are not essential and could in this case be combined into one. The operation of the air governor 41 will now be described.

*Operation of the air governor.*

It is to be noted that the tension of the springs 161 and 180 are so proportioned with respect to their diaphragms that the same air pressure operating against these springs would overcome the spring 180 before it would the spring 161 and vice versa. Were the pressure to drop the spring 161 would first move its plunger inward before the spring 180 would move its plunger inward.

The plunger 176 through its diaphragm 177 is constantly in communication with the pressure in the main reservoir 43 and when the pressure drops below a certain value at which it is desired to have the compressor start to replenish the supply of compressed air in the main reservoir 43 the spring 180 will move the plunger outward withdrawing the rod 178 from the valve 172 thus allowing the port 171 to be uncovered and permitting the air which is lying outside of the piston 147 to be exhausted. The cut-out valve is closed at this time due to the fact that the pressure in the main reservoir is not sufficient at this time to overcome the spring 161. The valve 155 having been closed for some time the pressure in the central space 143 and in the upper cylinder space 152 has been equalized. Consequently when the cut-in valve 172 is opened by the pressure reaching the predetermined value, the pistons 145 and 147 will be moved downward into the position shown in Fig. 5. In this position the port 169 is closed off to prevent leakage to the passageway 170 and the valve body 150 is shifted to such a position where it connects the passageways 184 and 185 with the passage 138 and cuts off communication between pasageways 184 and 185 with the central space 143. As a consequence the compressed air which is trapped in the auxiliary reservoir 42 and connected pipes flows through the port 137, passageways 184 and 185, passage 138 and pipe 139 into the valve chamber 140 of the main switch operating cylinder 142. This causes the main switch 17 to be closed in a manner, which will be described later, thereby starting the motor. The main switch is held closed by the air pressure back of it and as the pump 47 begins to operate it begins to move the plunger 77 for the starting resistance short-circuiting switch 26 to close. Movement of the plunger 77 upward releases a mechanical catch which will hold the main switch in position as will be described later. After the starting resistance is cut out the compressor is loaded as previously described and compressed air is delivered to the main reservoir 43. The pressure is thus raised in the main reservoir 43 until it reaches the desired maximum pressure at which the compressor is to be stopped. When this pressure is reached air passing through the port 136, through the central space 143, through the port 165, passage 166 and into the chamber 163, raises the plunger 159 thereby moving the valve 155, which is termed the cut-out valve, off of its seat 156, permitting the escape of pressure from the cylinder space 152 above the piston 145.

As the air pressure increased it operated upon the piston 176 to close the valve 172 before the valve 155 was opened. This, as previously explained is due to the different spring strength for the two valves. As soon as the cut-in valve 172 had previously closed, the air pressure had equalized itself upon both sides of the piston 147 so that when the cut-out valve 155 was opened and released the pressure in the space 152 the pistons 145 and 147 moved upward to the uppermost position as is shown in Fig. 8. In this position the valve body 150 has uncovered the passageways 184 and 185 thus establishing communication between these passages and the central chamber 143 so that air at the then high pressure may pass from the main reservoir 43 by way of the pipe 44 and port 136 to the central chamber 143 and through the passages 184 and 185 and port 137 into the auxiliary reservoir 42. The air pressure thus created in the reservoir is transmitted through the pipe 90 to the plunger 86 to open the valve 83 in the hydraulic system.

Opening of the hydraulic valve 83 as previously described operates the compressor unloading mechanism and thereafter causes opening of the starting resistance switch 26 which in turn trips out the main switch as will be described below.

From the above it is apparent that the governor operates at a predetermined minimum pressure in the tank 43 to close the main switch, bring the motor to speed, short circuit the starting resistance and thereafter load the compressor and permit operation of the same until a predetermined maximum pressure is reached in the main reservoir. When this predetermined maximum pressure is reached the governor operates to open the hydraulic main, thereby causing unloading of the compressor, opening of the starting resistance switch 26 and tripping out of the main switch to stop the motor.

*Circuit connections.*

I shall now describe the circuit connections and the instrumentalities for controlling the same. In this connection it is to be noted that I have illustrated a three-phase power circuit but it is apparent that other types of power may be employed if found desirable. The incoming line wires 187, 188 and 189 are joined by separable connectors 190 of any preferred type to the wires 191, 192 and 193 respectively of which the wires 191 and 192 are connected to suitable terminals 194 and 195 which are suitably insulated from the switch-board base 25. The terminals 194 and 195 are connected to the relatively stationary contacts 196 and 197 which are mounted upon the front of the switch-board. The relatively stationary contacts 196 and 197 comprise a pivoted arm 198 swinging about a shaft 199 and pressed down by a spring 332. Upon the outer end of the arm is mounted an arc receiving contact 200 for making the initial and final contact with the corresponding member of the relatively movable terminals. The conducting or actual switching contact 201 is mounted back of the arc receiving contact 200 and is adapted to make permanent contact during the time that the switch is closed and to carry the necessary current. These contacts 200 and 201 are connected through a suitable flexible conductor or strap 202 to the terminals 194 or 195 mounted upon the rear of the board 25.

The one main line wire 189 is connected directly to the motor through the lead 193 as it is unnecessary to lead this line wire through the main switch. The other two primary leads 204 and 205 are connected through suitable connectors 190 to the wires 206 and 207 respectively, which are joined to suitable terminals 209 and 208 upon a pair of lugs 210 and 211 forming a part of the switch operating cylinder 142, the terminals being suitably insulated from the frame of the machine.

The switch operating cylinder 142 is provided with a spring containing housing 212 and a pair of stationary wiping contacts 214 and 215 lie along the side of this housing with plates of insulation 216 and 217 interposed. The operating cylinder 142 has a plunger rod at 218 which bears at its upper end a contact bearing frame 219 which supports the relatively movable contacts 220 and 221. These contacts are constructed in substantially the same manner as the contacts 196 and 197 except that the same are not mounted to be yielding. The transverse frame 219 carries a plurality of insulating barriers 222, 223, 224 and 225 which form a pair of arc chambers 226 and 227 for the contact pairs 196 and 220 and 197 and 221 respectively. The barriers 222 to 225 are spaced apart by suitable insulating collars through which clamping bolts are passed. The movable contacts 220 and 221 are connected by means of movable wipers 228 and 229 to the stationary wipers 214 and 215. It can now be seen that when the contacts 220 and 221 are brought against the contacts 196 and 197, the line wires 187, 188 and 189 will be connected directly to the primary leads 13 of the motor 2.

The secondary leads 18 are connected to the three wires 230, 231 and 232. The wire 230 runs along the back of the board 25 and is connected to a suitable terminal 233 which is mounted on an insulated support and provided at its upper end with a flexible connection 234 which connects it electrically to the upper end of the compressible resistance 22. The resistances 22, 23 and 24 are constructed of suitable pieces of carbon formed preferably in the shape of disks lying in a suitable tube in a manner well known in the art.

The conductor 231 is connected to a metallic connecting member 235 shown in dotted lines in Fig. 13. This connecting member 235 has its ends 236 and 237 projecting forward and resting upon suitable lugs formed upon the operating cylinder 73 for the starting resistance switch operating cylinder. These end terminals 236 and 237 are connected to stationary wiping contact plates 238 and 239 which extend vertically and are held out of contact with the frame of the machine by insulating sheets or strips 240 and 241. The movable wiper members 242 and 243 bear against the stationary wiper plates and are connected at their upper ends to the movable contact members 78 and 79 respectively, these contact members being supported upon the cross frame member 244. The cross frame member supports a plurality of barrier members 245, 246, 247 and 248 which form a pair of spark chambers for the contact pairs 78, 80 and 79, 81, respectively.

The contact member 235 is connected by a wire 249 to a terminal 250 upon the front of the board near the switch 26 and back of the same. This terminal is in turn connected by a strip 251 on the front of the board to a bolt which connects it to a terminal 252 on the rear of the board 25. The terminal 252 is connected by a flexible conductor 253 to the terminal 254 upon the upper end of the compressible resistance member 24.

The conductor 232 is connected to a terminal 255 on the back of the board 25 which terminal is in turn connected by a flexible connector 256 to the terminal 257 of the compressible resistance 23. The lower ends of the compressible resistances terminate in conducting members 258, 259 and 260 which are joined together by a common flexible conductor 261. The compressible resistance members 22 and 23 are supported at their lower ends upon a lever 262 that is pivoted at its center to the frame member 25. The lower end of the compressible resistance member 24 is supported upon an arm or bracket 263 which is held stationary upon the back of the board 25. The upper end of the resistance member 22 is provided with an insulated stud 264 which engages the end of a lever 265 pivoted on a pin 266 at the top of the board 25. The upper end of the compressible resistance member 23 is also provided with a compression stud 267 which engages one end of the lever 268 which is pivoted at its center to a bracket member 269 mounted near the upper end of the board 25. The other end of the lever 268 engages the compression stud 270 on the upper end of the compressible resistance member 24. It can now be seen that any pressure exerted by the lever 265 upon the upper end of the compressible resistance 22 is transmitted substantially undiminished to the other resistance members so that they are all compressed substantially equally.

The lever 265 is adapted to be moved to compress the starting resistances 22, 23 and 24 by upward movement of the piston rod 75 previous to closing the switch 26. The rod 75 carries at its upper end a collar 275 upon which rests an insulating collar 276 carrying a guiding sleeve 277 for guiding a spring 278. The lower end of the spring rests upon the collar 276 and the upper end of the spring engages a collar 279 which is adapted to engage the longer arm of the operating lever 265 for compressing the resistances. A hollow cylindrical member 280 is connected to the collar 279 and is adapted to telescope within the sleeve 277 for guiding the spring 278. The cylindrical member 280 is counterbored to receive the spring 281 which places the resistances under the desired initial tension. The tension of the spring 281 may be adjusted by a suitable set screw 282 which controls the value of the starting resistances.

It can now be seen that as the cylinder 73 is dumped full of oil and raised the piston rod 75 pressure will be transmitted through the spring 278 and arm 265 through the starting resistances 22, 23 and 24 and the resistance of these members decreased so that a greater flow of current may occur for speeding up the motor 2. When the piston 75 has moved to the top of the stroke the switch 26 will be closed and the resistances short circuited.

I shall now describe the structure and operation of the main switch operating cylinder 142 and connected parts.

*Main switch operating cylinder and pneumatic blow-out.*

The cylinder head 141 of the main switch operating cylinder 142 is provided with a boss 283 which has formed therein a plurality of valve ports and passages later to be described which boss is covered by the recessed cap member 284. This cap member 284 comprises a cylinder having the cylinder lining 285 within which slides the cylindrical portion 286 of a valve member 287 which is provided at its upper end with an enlarged shoulder or flange 288 bearing a yielding seat 289 which is adapted to engage the rim of the passage member 290 which forms a valve port communicating with a passageway 291 in the cylinder head 141. This passage 291 forms an exhaust passage connected to the pneumatic blow-out for the main switch. The area of the port 290 is greater than the area of the operating piston 286 to provide a differential operating surface to hold the valve 289 on the port 290. The valve member 287 has a central bleeding port 292 and this port permits the pressure within the chamber 140 and the pipe 139 to escape after the cylinder has been operated to close the main switch 17.

The cylindrical portion 286 of the valve member 287 is provided with a valve port 293 which when the valve member is forced to its lowermost position as shown in Fig. 11 is entirely covered by the cylindrical liner 285. A spring 294 is employed to hold the valve away from its seat 290 and thus permits the passage 291 to be put in communication with the interior of the cylinder by way of the passage 295. The cylinder 142 is provided with a closely fitting piston 296 which may be of any desired construction which is connected to the piston rod 218. The upper end of the cylinder is provided with a housing 212 for a spring 297 (see Fig. 4) which spring extends down to a point within the cylinder 142 where it rests upon the flange 298 of a spring housing sleeve 299. Within the housing 299 a spring 300 of less strength than the spring 297 is housed. The upper end of the spring 300 bears against an internal flange 301 of the sleeve 299 and the lower end of the spring rests against the top of the piston 296.

It will now be seen that when the governor admits air under pressure to the pipe 139, the valve member 287 is immediately raised and closes off the valve port of the member 290. At the same time the valve port 293 which is formed in the side of the valve member 287 is uncovered so that the air under pressure passes through the passage 295 into the interior of the cylinder 142 overcoming the spring 300 then engaging the lower end of the spring housing 299 and forcing the same upward against the tension of the spring 297 to complete its stroke. The completion of the stroke closes the main switch 17 by bringing the contacts 220 and 221 against the relatively stationary contacts 196 and 197.

For the initial closing of the main switch 17 before any pressure has been created in the main reservoir 43 I provide a lever 303 which has a socket 304 at its outer end for receiving a suitable handle 305. This lever is pivoted to the base-board 25 at its rear end by means of the bolt 306 and is provided with a roller 307 which is adapted to engage a bracket 308 formed upon the rear of the cross-frame 219. The bracket 308 is provided with a shoulder piece 309 that is adapted to engage a suitable catch or detent 310 mounted on the upper arm of a bell-crank member 311 which has a horizontal arm 312 which extends back of the piston rod 75 of the starting resistance switch 26. The transverse frame member 244 which is fastened on the piston rod 75 has a projecting finger 313 (see Fig. 12) which is adapted to strike the arm 312 and push it down against its spring 314 thereby tripping out the main switch. Thus when the starting resistance switch 26 opens and releases the compression of the resistances 22, 23 and 24 the finger 313 strikes the horizontal arm 312 and releases the movable members of the main switch 17 which main switch member is then moved downward under the combined influence of the two springs 297 and 300. Since the pressure in the chamber 140 and in the cylinder 142 has leaked away through the bleeder port 292 the valve member 287 will have been moved downward into the position shown in Fig. 11 because of the pressure of the spring 294. The spring 297 moves the piston 296 down very rapidly due to its greater tension during the first part of the stroke and the spring 300 moves it more gradually during the latter part of the stroke. Hence the air is forced out of the cylinder 142 through the passages 295, 291 and into a passageway 315 formed in the switch-board 25 which passage communicates with a pair of nozzles 316 and 317 having flat slots for projecting a thin flat stream of air. These nozzles are placed in suitable position back of the main switch 17 so that when the switch is tripped out and starts to open the air in being expelled from the cylinder 142 is projected into the arc chambers 227 and 226 in suitable position to blow out the arc which may be drawn between the movable and stationary contacts.

I shall now describe a feature of electrical protection for the motor.

*Over-load protective device for the motor.*

In Fig. 14 I have shown a wiring diagram of the motor and connected parts which varies from the connections shown in Figs. 4 and 13 in changing the connection of the secondary of the motor circuit to include a suitable over-load relay winding 318. The winding 318 is connected to the short circuit connection 78 and 79 of the starting resistance switch 26. This winding forms a solenoid supported upon a suitable frame 320 of magnetic material and having a plunger 321 projecting into the winding 318. The upper end of the plunger 321 is connected to a valve member 322 which closes off an exhaust port 323 to normally shut off the oil chamber 324 which is formed on the upper end of the solenoid frame 320 from the overflow pipe 325 which connects with the crank case. The chamber 324 is connected by a pipe 326 to the hydraulic main 66. Thus when the main switch 17 is closed and the motor brought up to speed by closing of the short circuiting switch if the work required of the motor is too great when the compressor is loaded, the plunger 321 will be moved downward to open the overflow connection to the hydraulic main and thus prevent overloading of the motor. If at any time during the operation of the motor and compressor the load becomes too severe the solenoid will open the valve 322 and thus prevent damage to the motor. The load at which the solenoid trips out the valve may be adjusted by means of a spring 327 the tension of which is controlled by a set screw 328.

The relay will not be influenced by starting current as it is not in circuit until the switch 26 is closed. Hence even if a large starting current is drawn no operation of the relay results, but after the switch 26 is closed the relay will release the pressure and cause opening of the main switch if more than full load current is drawn.

*General operation of the device.*

I shall now describe in general the operation of the device.

In order to start the compressor when there is no pressure in the tank 43 the handle 305 is inserted in the socket 304 of the lever 303 and the main switch is manually closed and held in that position while the motor is started. As soon as the motor begins turning the compressor, shaft 8 will also be turned and the pump 47 will be operated to create a pressure in the hydraulic main 66. The switch must be held closed as the latch member 310, 311 is tripped out by the finger 313 striking the arm 312. As oil is pumped into the hydraulic main it exerts a pressure against the piston 77 in the cylinder 73, the valve 83 being closed at this time. This raises the piston rod 75 so that the finger 313 disengages the horizontal arm 312 of the latch member 310 and 311 and permits it to engage the shoulder 309 and hold the main switch 17 in a closed position. As the rotation of the motor continues the hydraulic main and connected parts will be pumped full of oil, the piston 77 being slowly raised until the switch 26 is closed. The compressible starting resistances 22, 23 and 24 are compressed by the compression which is placed upon the spring 278 as the piston moves upward. When sufficient oil has been pumped into the cylinder 73 the switch 26 will be closed and the resistance cut out of the secondary of the motor which will then begin to operate at full speed. As previously explained the spring 76 of the piston 73 is of less strength than the spring 104 of the piston 98. Consequently a further increase in pressure in the hydraulic system must be accumulated before the strength of the spring 104 can be overcome. This will occur as clearly shown after the motor reaches full speed and as a consequence the piston 98 will be raised permitting the operating arm 38 of the unloader to rise and release the suction valves 27. At the same time the valve 39 which controls the cooling water is allowed to open and the compressor begins to operate. As the compressor begins to operate it creates a pressure in the main tank 43 which being transmitted to the pneumatic governor 41 closes the cut-in valve 172.

The piston structure 145, 147, if it was not already in the lowermost position was moved to the lowermost position, as is shown in Fig. 5 as soon as any pressure was created in the main reservoir. This is because the cut-in valve 172 was then opened and the cut-out valve 155 was closed and remained so until the desired maximum pressure was reached. While the main reservoir is being filled with compressed air the port 165 is uncovered and when the pressure reaches a certain predetermined point where the compressor is to be stopped the air acting upon the diaphragm 162 and piston 159 thrusts the rod 158 upward and opens the cut-out valve 155. The piston structure 145, 147 is then promptly moved to the upper position as shown in Fig. 8 thereby uncovering the valve ports 184, 185 and permitting compressed air at full pressure to enter the auxiliary reservoir 42 and from there to enter the pipe 90 and the chamber 89 below the diaphragm 87. The pressure of the air is such as to overcome the spring 91 and open the valve 83 permitting the oil which enters by the passageway 72 and some of the oil in the cylinder 73 to escape back into the crank chamber. The spring 104 immediately causes the plunger 98 and connected parts to drop down between strokes of the oil pump 47 because of escape of liquid from the hydraulic system until the stem 124 which is below the piston 98 strikes the top of the upper auxiliary piston 117 closing off the port 123 and forcing this piston 117 downward. The oil which is trapped between these pistons 117 and 118 transmits the pressure to the lower piston which is moved downward to open the valve 111. Opening of this valve quickly permits escape of oil from the cylinder 96 and allows the piston 98 to descend to its lowermost position, as is shown in Fig. 9 where it rests against the top of the auxiliary cylinder 112. By downward movement of the piston 98 the stem 100 is drawn down thereby moving the operating lever 38 of the unloader mechanism pushing the suction valves 27 off of their seats and holding the same in that position and closing the water valve 39 for cooling the cylinders.

The continued leakage of oil through the valve 83 and through the valve 111 permits the piston 77 to descend and open the switch 26 and thereafter releases the pressure upon the compressible starting resistances 22, 23 and 24 to increase the resistance in the secondary circuit of the motor. As the plunger 75 moves downward the finger 313 engages the arm 312 thereby tripping out the main switch 17 and permitting it to open under the action of the springs 297 and 300. The initial movement of the piston 296 in the cylinder 142 is rapid because of the relatively greater strength of the spring 297 and as a consequence the air which is trapped in the cylinder is discharged through the passageway 295 through the passage member 290 into the passageways 291 and 315 to the blowout nozzles 316 and 317 which extinguish any arc that may be drawn between the contacts of the main switch 17 thus effectively opening the circuit. The spring 300 brings the piston 296 down gently against the cylinder head 141. The main reservoir 43 is now full and the motor has been stopped.

It will be noted that provision has been made for preventing the idle running of the compressor if the body of lubricating oil in the crank case has dropped below the proper level, either by leakage or otherwise, in that the holding in of the main switch is dependent upon the catch 310 and if this catch is not released by rising of the cut-out switch 26 the air pressure which raised the plunger 296 of the main switch will soon leak away through the escapement or bleeder port 292 until the valve body 287 drops down and the switch descends and opens the circuit. That is to say, assume that the valve 150 of the governor 41 has been moved to the position shown in Fig. 5 whereby the auxiliary reservoir 42 is connected to the pipe 139 and to the cylinder 142, the piston 296 will be raised thereby closing the main switch 17 and starting the motor. The amount of air delivered by the auxiliary reservoir 42 is sufficient to hold the main switch closed for a short time which is under normal circumstances amply sufficient for the pump 47 to fill the hydraulic system with oil and to begin raising the plunger 77 for the cut-out switch 26. If however due to some fault of the electrical apparatus the motor does not start or if due to friction it does not properly speed up the pressure will not be built up in the hydraulic system to raise the plunger 77 the air in the main switch cylinder 142 will gradually escape until the valve 287 drops down and permits the air in the cylinder to exhaust through the blow-out passages and nozzles thereby causing the switch to open and shut down the motor.

Such cutting out of the motor and stopping of the compressor occurs if a phase is open as by blowing of a fuse and dropping off in speed or if excessive friction is created or if the voltage drops too low or when the coil is used up or leaks until it is down to about the danger level.

It is to be noted that the cut-out valve 155 closed as soon as the piston structure 145, 147 and the valve 150 were shifted to the uppermost position because of the connection of the port 165 with the passageway 138 which communicates with the pipe 139 and the chamber 140 in the main switch cylinder head. The small amount of air which was contained in the chamber 163 back of the operating piston of the cut-out valve is thus exhausted permitting the valve to close immediately.

While the reservoir is full both valves 172 and 155 are closed. As the air is used from the reservoir 43 and the pressure therein dropped to a predetermined minimum where the compressor is again to be started, the spring 180 overcoming the air pressure in the chamber 179 opens the cut-in valve 172 permitting the exhaust of air from below the smaller piston 147 thereby causing the piston structure to move downward and connect the passage 138 with the ports 184, 185 that connect with the auxiliary reservoir 42 which is full of air at main tank pressure. As soon as the valve is thus shifted the air from the auxiliary reservoir 42 flows through the pipe 139 into the chamber 140 of the valve 287 causing the valve to rise and close off the port 290 thereby permitting the air to pass through the port 293 and passageway 295 into the cylinder 142 to raise the piston and close the main switch 17. The operation from there on is the same as previously described.

I shall now describe the structure and operation of the modification shown in Figs. 16 and 17.

The mechanism of the governor 350 is mounted upon a base portion 351 and is inclosed in a suitable cover 352. The diaphragm plate or piston 353 is provided with a series of stems 354 and 355 which pass up through the base and are in direct communication with the springs 356 and 357 by means of a collar 358. The collar 358 is provided at its upper end with a guiding sleeve 359. The lower ends of the springs 356 and 357 rest upon the collar 358 and the upper ends of the springs engage a collar 360. A suitable shaft disposed within the guiding sleeve 359 is provided at its lower end with a stem 362 which is threaded through the base 351, forming a suitable stop for limiting the upward travel of the diaphragm plate 353. The upper end of the shaft is provided with a reduced threaded portion 363 which passes through the collar 360 and is threaded into an adjusting nut 364. The cutting-out pressure at which the governor has been set to operate may be changed by increasing or decreasing the tension on the springs 356 and 357 by means of the adjusting nut 364.

The diaphragm plate or piston 353 rests upon a flexible diaphragm 365. The diaphragm is held in place by a recessed piston head 366 the recess or chamber 367 of which is at all times in direct communication with the main reservoir 43 by means of the pipe line 368.

A movable contact carrier 369 is pivoted by means of a pin 370 to a pair of toggle arms or links 371 and 372. The links 371 and 372 are connected to the collar 358 by a pin 374. A pair of suitable springs 375 and 376 are secured under tension to the pins 373 and 377 (as shown in Fig. 17) to insure a quick and positive toggle movement of the contact 378 from one extreme to another.

The movable contact 378 is connected to the contact carrier 369 by a flat spring metal contact arm 379.

A blow-out coil 381 is connected in the circuit through the stationary contact member 382 which is secured to an arc chute 383. The arc chute is preferably molded of a fireproof material. A stop is secured to the base of the arc chute for stopping the downward movement of the contact 378 when the circuit to the motor 2 has been broken.

A magnet valve 384 which is provided with an auxiliary air reservoir 42′ is connected in series with the governor 350.

Within the main body 393 of the magnet valve 384 is a coil of insulated wire 394 wound upon a brass sleeve 395. The coil 394 and core 395 constitute an iron-clad magnet of which the casting 396 forms the return path. The lead 385 from the blow out coil 381 is connected to one terminal post of the magnet coil 394. The other terminal post of the magnet coil is connected to the main line wire 187. As previously stated the other lead 388 from the blow-out coil 381 is connected to the stationary contact member 382. The terminal 389 is suitably connected to the main line wire 188.

The passageway 397 provided in the main body of the magnet valve is at all times in direct communication with the main reservoir 43 through the pipe line 398. The main body portion of the magnet valve is provided with two outlet ports, one of which, 399, connects the passageway 397 to the auxiliary reservoir by way of the passageway 400, thereby putting the auxiliary reservoir in direct communication with the main reservoir when the magnet is deenergized due to the cutting out of the governor 350.

The other port 401 connects the auxiliary reservoir 42′ by way of the passageways 400 and 402 and pipe line 139′ to the valve operating chamber 140 in the cylinder head 141 of the main switch cylinder 142 when the magnet is energized due to the cutting in of the governor 350.

The body of the magnet valve bears a controlling valve 403 for controlling the admission to and exhaust from the auxiliary reservoir 42, as will be described. When the magnet is deenergized due to the cutting out of the governor 350 the valve spring 404 is enabled to open the supply port 399 and close the port 401.

The auxiliary reservoir 42′ is connected by a pipe 90′ to the recess or chamber 89 of the starting resistance operating cylinder in the same manner as is shown in Figs. 4 and 5.

Assume that the operation of the compressor has raised the air pressure in the main reservoir 43 to the point at which the governor 350 has been set to cut out.

As the chamber 367 is at all times in direct communication with the main reservoir air under pressure entering the chamber 367 from the main reservoir 43 will raise the diaphragm 365. The stems of the diaphragm plate 353 will move the collar 358 upward against the tension of the springs 356 and 357. This upward movement of the links 371 and 372 which are secured to the collar 358 causes the throw over springs 375 and 376 to move the contact carrier 369 and movable contact 378 downward with a quick snap movement thereby breaking the circuit to the motor.

The arc which may be drawn between the stationary and movable contacts 382 and 378 is effectively suppressed in the arc chute 383 by means of the magnetic blow-out coil 381.

Due to the cutting-out of the governor 350 the magnet coil 395 of the magnet valve is deenergized. The deenergization of the magnet causes the magnetic attraction between the magnet core 395 and armature 396 to be broken, enabling the valve spring 404 to open the supply-port 399, and close the port 401. This allows air from the main reservoir to pass through the port 399 and passageway 400, to the chamber 89 of the starting resistance switch cylinder by way of the auxiliary reservoir 42′. The pressure in the chamber 89 raises the diaphragm 87 thereby opening the valve 83, and allowing the liquid under pressure to escape through the port 84 and discharge pipe 93 back to the crank case. As previously explained this leakage of pressure causes the valves 27 to be unloaded and the starting resistance switch to be opened. When the minimum pressure in the main reservoir has been reached the action of the springs 356 and 357 will overcome the pressure in chamber 367. The collar 358 links 371 and 372, diaphragm plate 353 and diaphragm 365 will be forced downward enabling the throw over springs to move the contact 378 upward until brought into engagement with the stationary contact 382, thereby closing the circuit to the motor. The magnet coil 394 is immediately energized and the armature 396 is drawn toward the magnet coil, thereby pushing armature stem 405 inward opening port 401 and closing port 399. This action cuts off communication between the main and auxiliary reservoirs and allows the compressed air which is trapped in the auxiliary reservoir 42′ and connected pipes to flow through the pipe 139′ into the valve chamber 140 of the main switch cylinder thereby closing the main switch 17 as heretofore explained.

This form of control is superior in some respects to that previously described because it puts the operation of the air governor 384 under the control of the electrical condition of the system, that is, the air governor will unload the compressor if the potential goes off the line and when the potential comes back on the line, the motor will be started with the compressor running light until the proper speed is attained.

Unless some such means is provided the main starting switch would have to be closed by hand. In the form of governor previously described where the air governor is directly controlled by the air pressure to operate the valves for starting, loading, and stopping the motor and compressor, failure of the potential will stop the motor and compressor and the compressor will automatically unload and the main switch open, but as the main reservoir has not been pumped up to the cut-out pressure the governor will remain at the cut-in position but if potential comes back on the line, starting will not be accomplished as no air is available to operate the main switch cylinder and nothing has occurred to make the air governor change position. Consequently in that form of control failure of potential or accidental opening of the line or any electrical condition, which causes the motor to stop during the time it is operating to pump up the tank, puts the system out of operation until the main switch is again closed manually.

Certain features of this device are shown and claimed in copending divisional applications Serial No. 335,815 and Serial No. 335,816 filed Nov. 5, 1919. The former application, now Patent No. 1,498,714, of June 24, 1924, is directed to the switch mechanism for starting and stopping the motor. The latter application, now Patent No. 1,510,169, of September 30, 1924, is directed more particularly to the low voltage control of the stopping and starting of the motor compressor unit.

While I have described my invention with reference to the details of a particular embodiment, I do not wish to be limited to the details shown and described nor to the proportion and dimensions indicated except where I have clearly indicated that they are essential as it is apparent that my invention may appear in a variety of forms and modifications.

I claim:

1. In combination, a driving motor, a control switch for the motor, a compressor, means for unloading said compressor and a hydraulic pressure system governing the control switch and the unloading means.

2. In combination, a driving motor, a control switch for the motor, a compressor, means for unloading said compressor, a pump connected to the driving motor and a hydraulic pressure system communicating with the pump and governing the control switch and the unloading means.

3. In combination, a driving motor, a control switch for the motor, a pump driven by the motor, a hydraulic pressure system connected to the pump, and means dependent upon said hydraulic pressure system for operating the control switch, said hydraulic system having a graduated orifice.

4. In combination, a driving motor, a starting resistance for the motor, a switch for cutting out said resistance, a fluid pump, means operated by the fluid delivered by said pump for operating said switch, said means comprising a fluid container communicating with said pump, said container having an escapement orifice so that the fluid pressure in said container is dependent upon the speed of said pump.

5. In combination, a driving motor, power controlling means for said motor, a compressor driven by said motor, unloading means for said compressor, a piston for operating said power controlling means, a piston for operating the unloading mechanism and a spring for opposing the motion of each of said pistons, the spring of the power controlling piston invariably causing operation of the power controlling means before operation of the unloading means and a common source of fluid pressure for operating said pistons.

6. In combination, a driving motor, power controlling means for said motor, a compressor driven by said motor, unloading means for said compressor, an operating cylinder having a spring pressed piston for operating the power controlling means, a cylinder having a spring pressed piston for operating the unloading means, the piston spring of first said cylinder being weaker than the piston spring of said latter and a pump driven by said motor for delivering fluid pressure to said cylinders.

7. In combination, an electric motor, a starting resistance switch for said motor, an operating cylinder for said switch, a machine adapted to be driven by said motor, a body of oil for lubricating said driven machine, an oil pump driven by said motor, said oil pump being connected to the operating piston of said switch, the operation of said pump being dependent upon the level of said body of oil.

8. In combination, a fluid compressor, having a closed crank-case, a body of oil in said crank-case for lubricating said compressor, an unloader for said compressor and an hydraulic system communicating with said body of oil for overcoming said unloading means.

9. In combination, a fluid compressor, a body of oil for lubricating said fluid compressor, unloading means normally active to unload the compressor, a fluid piston operable to render said unloading means inactive, a pump connected to the compressor shaft, said pump delivering fluid to said piston for moving the same, the delivery of said fluid being dependent upon the level of the oil.

10. In combination, a fluid compressor, a body of lubricating oil for lubricating said compressor, unloading means for said compressor, a piston and cylinder for disabling said unloading means, a hydraulic system comprising a pump communicating with said body of oil for operating the compressor unloading means, and means responsive to the pressure generated by operation of the compressor for disabling said hydraulic system.

11. In combination, a fluid compressor, a tank connected to said compressor, a body of lubricating oil for lubricating said compressor, unloading means for said compressor, disabling means for said unloading means, said disabling means comprising a piston and cylinder, a pump having its intake normally below the level of the body of oil, a hydraulic system connecting said pump and said cylinder, and governing means connected to said tank and responsive to the pressure of fluid therein for disabling said hydraulic system.

12. In combination, a compressor having an inclosed crank-case, a body of oil in said crank-case, a pump having its intake normally slightly below the level of oil in the crank-case, means connecting said pump to the crank-shaft of said compressor, and unloading means for the compressor dependent upon said pump.

13. In combination, a driving motor, a switch for said motor, a machine driven by said motor, a body of lubricating oil for said machine and means dependent upon a predetermined level of said body of lubricating oil for opening said switch.

14. In combination, a driving motor, a machine driven by said motor, a body of lubricating oil for said machine, means for automatically closing the switch of said motor and means for causing said switch to open, said latter means being dependent upon a predetermined level of said body of oil.

15. In combination, a motor, a machine driven by said motor, a main switch for said motor, starting resistances for said motor, a cut-out switch for said starting resistance, a body of lubricating oil for said driven machine, automatic means for closing said main switch, means dependent upon the level of said body of oil for closing said cut-out switch, and means actuated by said cut-out switch for causing the main switch to be opened.

16. In combination, a driving electric motor, a fluid compressor connected to said motor, a body of oil for lubricating said fluid compressor, a starting resistance for said motor, a cut-out switch for said starting resistance, unloading means for said compressor, a fluid pressure governor controlling closing of the main switch, and means communicating with said body of oil for operating said cut-out switch and for disabling said unloading means automatically after the main switch is closed.

17. In combination, a driving motor, a fluid compressor, a tank connected to the compressor, a fluid governor responsive to the pressure in said tank, a main switch for said motor, a starting resistance cut-out switch for said motor, unloading means for the compressor, operating means for said unloading means, means controlled by said fluid governor for automatically closing said main switch and means responsive to the speed of said motor for closing the cut-out switch and for loading the compressor.

18. In combination, a driving motor, a compressor, a body of oil for lubricating said compressor, a control element for starting said driving motor, a tank connected to the compressor, a fluid pressure responsive governor connected to said tank, means controlled by said pressure governor for operating said control element to start the motor and means dependent upon a predetermined level of the body of oil for controlling the operation of said control element to stop said motor.

19. In combination, a driving motor, a fluid compressor operated by said driving motor, a tank connected to said compressor, a fluid pressure responsive governor for said tank, a main switch for said motor, a body of lubricating oil in the crank-case of said compressor, means dependent upon said governor for closing said main switch at a predetermined pressure, and means dependent upon a predetermined level of oil in said crank chamber for causing the main switch to be opened.

20. In combination, a driving motor, a main switch for said motor, a compressor operated by said motor, a reservoir connected to said compressor, means responsive to the pressure in said reservoir for closing said main switch, a starting resistance cut-out switch, loading means for the compressor, a hydraulic system dependent upon the speed of said motor for closing said cut-out switch and for loading said motor, and means responsive to the pressure in said reservoir for unloading the compressor and opening said cut-out switch, and means dependent upon opening of said cut-out switch for opening said main switch.

21. In combination, a driving motor, a compressor having a crank-case, a body of oil in said crank-case, a starting resistance cut-out switch for the motor, a pump mounted in the crank-case and having its intake normally below the level of the body of oil, a cylinder for closing said cut-out switch and a conduit connecting said pump and cylinder, said conduit having an escapement orifice, for preventing operation of the cut-out switch below a predetermined speed.

22. In combination, a driving motor, a starting resistance cut-out switch for the motor, a machine driven by said motor, a load applying device governing said machine, a body of oil for lubricating said machine, a hydraulic system comprising a pump having its intake normally below the level of the oil for operating said cut-out switch and said load applying device in turn only.

23. In combination, a driving motor, a starting resistance cut-out switch for the motor, a machine adapted to be driven by said motor, a load applying device for said machine, a body of oil for lubricating said machine, a cylinder for operating said switch, a cylinder for operating said load applying device, a common hydraulic main connected to said cylinders and a pump driven in accordance with the speed of the motor for forcing oil into said hydraulic main to operate first the switch and then the load applying device.

24. In combination, a driving motor, a starting resistance cut-out switch for said motor, a machine adapted to be driven by said motor, a load applying device for said machine, means driven in accordance with the speed of the motor, said means comprising a hydraulic pump and means dependent upon said pump for invariably operating the cut-out switch before the load applying device and for invariably releasing the load-applying device before releasing the switch.

25. In combination a driving motor, a fluid compressor operated by said motor, a starting resistance cut-out switch for said motor, a hydraulic pump driven in proportion to the speed of the motor, an operating cylinder for said switch, a loading device for the compressor, an operating cylinder for the loading device, a spring for each operating cylinder, a main reservoir, a hydraulic system connecting the pump with said operating cylinders and means responsive to pressure in the reservoir for opening the hydraulic main, the spring of said load applying cylinder being stronger than the spring of said switch closing cylinder with respect to the hydraulic pressure to cause the compressor to be unloaded before the cut-out switch is opened.

26. A load applying device comprising a main cylinder a piston for said main cylinder, a spring for said main cylinder, an operating rod connected to said piston, a pair of auxiliary pistons, a spring between the auxiliary pistons, a valve connected to one of said auxiliary pistons, a spring means for normally holding said valve closed, pressure generating means for moving the main piston against its piston springs, means for admitting oil between the auxiliary pistons and means controlled by inward movement of the main piston under the influence of its spring for trapping the oil between the auxiliary pistons and opening said valve.

27. In a load applying device, a cylinder, a main piston for said cylinder, a spring for said main piston, a valve, an auxiliary piston for actuating said valve, a spring for moving said auxiliary piston toward said main piston and for holding said valve in closed position, an intermediate auxiliary piston between the main piston and said first auxiliary piston, means for forcing the main piston against its spring, means causing the intermediate piston to follow the main piston, means controlled by inward movement of the main piston for trapping a body of liquid between the intermediate piston and first said auxiliary piston and for transmitting the pressure of the main spring to open said valve.

28. In combination a cylinder, a main operating piston, a spring tending to move the piston inward in the cylinder, an auxiliary piston at the other end of the cylinder, a cylinder head having a valve port therein, a valve connected to said auxiliary piston, means for introducing fluid under pressure into the cylinder, said cylinder having means for equalizing the pressure on both sides of the auxiliary piston and means for trapping a body of fluid between the main piston and the auxiliary piston when the main piston is moved inward under the spring.

29. In combination a cylinder, a main piston in said cylinder, a spring for moving the piston in the cylinder, an exhaust valve for the cylinder, an auxiliary piston controlling said exhaust valve, means for forcing liquid under pressure into said cylinder to force the main piston outward against its spring, and means for permitting the pressure to equalize upon both sides of the auxiliary piston as the main piston moves out against the spring and for trapping a body of liquid between the main piston and the auxiliary piston when the main piston is moved inward by the spring.

30. In combination a cylinder, a main operating piston in said cylinder, a spring opposing the movement of said operating piston, an exhaust valve for releasing pressure in said cylinder, an auxiliary piston controlling said exhaust valve, an intermediate piston between said main piston and said auxiliary piston, said intermediate piston having a valve port therein, means on the main piston cooperating with said valve port to trap a body of liquid between the intermediate piston and the auxiliary piston to open the exhaust port.

31. In combination a cylinder, an operating piston in said cylinder, a spring opposing the movement of said operating cylinder, an exhaust valve for said cylinder, an auxiliary piston connected to said exhaust valve, said cylinder having ports for admitting fluid under pressure between the main piston and the auxiliary piston and below the auxiliary piston, an intermediate piston between said other pistons, a port in said intermediate piston, means on said main piston cooperating with said port to trap fluid between the intermediate piston and the auxiliary piston and a valve port in the cylinder for relieving the pressure of the trapped fluid after the exhaust port is opened.

32. In combination, a compressor cylinder having a water jacket, a valve for said compressor cylinder, a conduit for conveying cooling water to said water jacket, a valve in said conduit, means for opening the valve in the cylinder and for closing the valve in said conduit, said means being controlled by a common operating element.

33. In combination a cylinder having a piston, means for pumping liquid under pressure into said cylinder, a release valve for permitting the escape of fluid from said cylinder, a chamber communicating through said valve with said cylinder, an exhaust passage communicating with said chamber for permitting some of the liquid to escape from the chamber, and another passage communicating with said exhaust passage and with the top of the cylinder to permit liquid which is forced through the valve into said chamber to flow into the cylinder upon the upper side of the piston.

34. In combination a compressor, a motor for operating said compressor, a main switch for the motor, a starting resistance cutout switch for the motor, operating cylinders for said switches, an auxiliary air reservoir, means for connecting the auxiliary reservoir to the switch for closing the main switch, said means having a leakage port for permitting the leakage of air from the auxiliary reservoir and operating cylinder of the main switch, a mechanical detent for holding the main switch closed, said detent being normally disabled while the starting resistance switch is opened and means controlled by the speed of the motor for closing the starting resistance switch.

35. In combination a compressor, a motor for operating said compressor, a main switch for the motor, a starting resistance cutout switch for the motor, operating cylinders for said switches, an auxiliary air reservoir, means for connecting the auxiliary reservoir to the switch for closing the main switch, said means having a leakage port for permitting the leakage of air from the auxiliary reservoir and operating cylinder of the main switch, a mechanical detent for holding the main switch closed, said detent being normally disabled while the starting resistance switch is opened, a body of oil for lubricating the compressor and means controlled by the level of said body of oil for closing said starting resistance switch.

36. In combination a motor, a main switch for said motor, a starting resistance cutout switch controlling the main switch, an overload relay connected in series relation with the motor, a fluid pressure pump driven by the motor, a fluid pressure system connected to the pump for actuating said resistance cuotout switch, and a valve for said fluid pressure system actuable by said overload relay.

37. In combination a motor, a switch for closing the circuit of said motor, a mechanical detent for holding said switch closed, a starting resistance cutout switch controlling said mechanical detent, an overload relay connected serially in relation to said motor, a fluid pressure system controlling the starting resistance cutout switch, and a valve controlling the fluid pressure system, said valve being operable by said overload relay.

38. In combination, a motor, a driven machine, a switch for the motor, an oiling system for the driven machine, and means dependent upon the oiling system for operating the switch.

39. In combination a motor, an air compressor driven by the motor, a switch for the motor, an oiling system for the compressor, and means responsive to the air pressure for operating the switch through the medium of the oiling system.

40. In combination, a motor, a starting switch for the motor, a main pressure reservoir, an auxiliary reservoir, a switch operating cylinder, a valve for charging the auxiliary reservoir from the main reservoir and for connecting the auxiliary reservoir to the switch cylinder, and means subject to the pressure in the main reservoir for actuating said valve.

41. In combination, a motor, a switch for said motor, means for closing said switch, a fluid pump driven by said motor, a fluid container fed by said pump and having an escapement orifice so that the pressure of the fluid is dependent upon the speed of said pump, and means dependent upon the fluid pressure for holding said switch closed.

42. In combination a motor, a switch for said motor, means for closing said switch and for holding said switch closed for a predetermined time interval, a fluid pump driven by said motor, a fluid container fed by said pump and having an escapement orifice so that the pressure of the fluid is dependent upon the speed of said pump, and means dependent upon the fluid pressure for holding said switch closed.

43. In combination a motor, a switch for said motor, means for closing said switch and for holding said switch closed for a predetermined time interval, and means dependent upon the speed of said motor for holding said switch closed.

44. In combination a motor, a switch for said motor, means for closing said switch, a latch operable to hold said switch closed, and means responsive to the speed of said motor for operating said latch.

45. In combination a motor, a switch for said motor, means for closing said switch and for holding said switch closed for a predetermined time interval, a latch operable to hold said switch closed, and means responsive to the speed of said motor for operating said latch.

46. In combination a motor, a switch for said motor, means for closing said switch, a machine driven by said motor, said machine having a lubricating system, and means dependent upon said lubricating system for holding said switch closed.

47. In combination a motor, a switch for said motor, means for closing said switch and for holding said switch closed for a predetermined time interval, a machine driven by said motor, said machine having a lubricating system, and means dependent upon said lubricating system for holding said switch closed.

48. In combination a motor, a switch for said motor, means for closing said switch, a machine driven by said motor, said machine having a lubricating system fed from a body of lubricating oil, and means dependent upon a predetermined level of the body of oil for holding said switch closed.

49. In combination a motor, a switch for said motor, means for closing said switch and for holding said switch closed for a predetermined time interval, a machine driven by said motor, said machine having a lubricating system fed from a body of lubricating oil, and means dependent upon a predetermined level of the body of oil for holding said switch closed.

50. In combination a driven machine having a lubricating system fed from a body of lubricating oil, independent means for driving said machine, means for rendering said driving means active to drive said machine, and means dependent upon a predetermined level of the body of lubricating oil for actuating said second named means.

51. In combination a driven machine having a lubricating system, independent means for driving said machine, and means dependent upon the lubricating system for controlling said driving means.

52. In combination a driven machine having a lubricating system, independent means for driving said machine, means for rendering said driving means active to start said machine, and means dependent upon said lubricating system for maintaining the active condition of said driving means to drive said machine.

53. In combination a driven machine having a lubricating system fed from a body of lubricating oil, independent means for driving said machine, means for rendering said driving means active to start said machine, and means dependent upon the level of the body of oil for maintaining the active condition of said driving means to drive said machine.

54. In combination a motor, a main switch for the motor, means for closing said main switch, a starting resistance cut-out switch, and means dependent upon the speed of said motor for operating said cut-out switch and for holding said main switch closed.

55. In combination a motor, a main switch for said motor, means for closing said main switch and for holding said main switch closed for a predetermined time interval, a starting resistance cut-out switch, and means dependent upon the speed of said motor for operating said cut-out switch and for holding said main switch closed.

56. In combination a motor, a main switch for the motor, means for closing said main switch, a starting resistance cut-out switch, a pump operated by said motor, a fluid container fed by said pump having an escapement orifice so that the pressure of the fluid is dependent upon the speed of said pump, and means responsive to the fluid pressure for operating said cut-out switch and for holding said main switch closed.

57. In combination a motor, a main switch for the motor, means for closing said main switch and for holding said main switch closed for a predetermined time interval, a starting resistance cut-out switch, a pump operated by said motor, a fluid container fed by said pump having an escapement orifice so that the pressure of the fluid is dependent upon the speed of said pump, and means responsive to the fluid pressure for operating said cut-out switch and for holding said main switch closed.

58. In combination a motor, a main switch for the motor, means for closing said main switch, a starting resistance cut-out switch, a compressor driven by said motor, said compressor having a lubricating system, a reservoir fed by said compressor, means dependent upon said lubricating system for operating said cut-out switch and for holding said main switch closed, and means actuated by the pressure in said reservoir for influencing said lubricating system to release both of said switches.

59. In combination a motor, a switch for said motor, means for closing said switch, a compressor driven by said motor, said compressor having a lubricating system, a reservoir fed by said compressor, means dependent upon said lubricating system for holding said switch closed, and means actuated by the pressure in said reservoir for influencing said lubricating system to release said switch.

60. In combination a motor, a switch for said motor, means for closing said switch, a compressor driven by said motor, said compressor having a lubricating system, a reservoir fed by said compressor, means dependent upon said lubricating system for holding said switch closed, and means actuated by the pressure in said reservoir for releasing said switch.

61. In combination a motor, a switch for said motor, means for closing said switch, a compressor driven by said motor, a reservoir for said compressor means dependent upon the speed of said motor for holding said switch closed, and means actuated by the pressure in said reservoir for releasing said switch.

62. The combination of a compressor, a reservoir fed by said compressor, means for driving said compressor, means for rendering said driving means active, means dependent upon the speed of said compressor for controlling said driving means, and means actuated by the pressure in said reservoir for rendering said driving means inactive.

63. The combination of a compressor having a lubricating system, a reservoir fed by said compressor, means for driving said compressor, means for rendering said driving means active, means dependent upon said lubricating system for controlling said second named means, and means actuated by a predetermined pressure in said reservoir for rendering said driving means inactive.

64. The combination of a compressor having a lubricating system, a fluid container fed by said compressor, means for driving said compressor, and means cooperating with said lubricating system for rendering said driving means active or inactive in accordance with the pressure in said container and in accordance with the condition of said lubricating system.

65. The combination of a motor, a switch for said motor, means for closing said switch to start said motor, means dependent upon the speed of said motor for holding said switch closed, and means for loading said motor when said motor has attained a predetermined speed.

66. The combination of a motor, a switch for said motor, means for closing said switch to start said motor, a machine driven by said motor, means dependent upon the speed of said machine for holding said switch closed, and means dependent upon the speed of said machine for loading said machine.

67. The combination of a machine having a lubricating system, driving means therefor, and means dependent upon said lubricating system for loading said machine.

68. The combination of a machine having a lubricating system fed from a body of lubricating oil, driving means for said machine, and means dependent upon the level of said body of oil for loading said machine.

69. The combination of a machine, driving means for said machine, means for loading or unloading said machine dependent upon a predetermined speed of said machine, and means controlled by said loading and unloading means for stopping said driving means after said machine has been unloaded.

70. The combination of a machine having a lubricating system, driving means therefor, means controlled by said lubricating system for loading or unloading said machine, dependent upon a predetermined speed of said machine, and means cooperating with said lubricating system for rendering said driving means inactive after said machine has been unloaded.

71. The combination of a compressor, driving means therefor, a fluid container fed by said compressor, means for rendering said driving means active to drive the compressor, means for loading or unloading said compressor dependent upon a predetermined speed of said compressor, means for rendering said driving means inactive when the fluid in said container has attained a predetermined pressure, and means dependent upon the speed of said compressor and cooperating with said last named means for rendering said driving means inactive after said compressor has been unloaded.

72. In an unloader, an unloader cylinder, a piston in the cylinder, a spring for the piston, an exhaust port for the cylinder, a valve for the exhaust port, a piston for opening the valve and a spring for holding the valve closed, and means actuated by inward motion of the unloader piston for applying pressure to the valve piston for opening the valve.

73. In an unloader, an unloader cylinder, a piston in the cylinder, a spring for the piston, an exhaust port for the cylinder, a valve for the exhaust port, a piston for opening the valve and a spring for holding the valve closed, and means actuated by inward motion of the unloader piston for applying pressure to the valve piston for opening the valve, said cylinder having a release port for the release of pressure on the valve piston to permit the valve spring to close the exhaust port.

74. In combination, a motor, an air compressor, a switch for the motor and means dependent upon the pressure of air and dependent upon the ability of the compressor to speed up, for operating the switch.

75. In combination, a motor, an air compressor, a switch for the motor and means dependent upon the pressure of the compressed air and dependent upon the attainment of a predetermined speed by the compressor within a given period of time for operating the switch.

76. In combination, a motor, an air compressor, a starting resistance for the motor, a switch for cutting out the starting resistance, means dependent upon the pressure of the compressed air and dependent upon the attainment of a predetermined speed by the compressor within a predetermined period of time for operating the switch to cut out the starting resistance.

77. In combination, a motor, an air compressor, a loading device for the air compressor, a starting resistance for the motor, a switch for cutting out the starting resistance, means dependent upon the pressure of the air and dependent upon the attainment of a predetermined speed by the compressor within a predetermined period of time for first operating the switch to cut out the starting resistance and then operating the loading device for loading the compressor.

78. In combination, a motor, an air compressor, a loading device for the air compressor, a starting resistance for the motor, a switch for cutting out the starting resistance, means dependent upon the pressure of the air and dependent upon the attainment of a predetermined speed by the compressor within a predetermined period of time for first operating the switch to cut out the starting resistance and then operating the loading device for loading the compressor, said means comprising a fluid pressure system and a pump constantly connected to the motor.

79. In combination, a motor, an air compressor driven by the motor, a switch for the motor, and oiling system for the compressor, and means actuated by the air pressure for governing the operation of the switch through the medium of the oiling system.

80. In combination, a driving motor, a main switch for the motor, a starting resistance for the motor, a switch for cutting out said resistance, a pump invariably connected with the motor, means for closing the main switch independently of the operation of the motor, and means actuated by said pump for operating said second switch.

81. In combination, a driving motor for operating a driven machine, a main switch for the motor, a starting resistance for the motor, an auxiliary switch for cutting out said starting resistance, a pump of small capacity compared with the power of the motor, invariably connected with the motor, means for closing the main switch independently of the operation of the motor, and means actuated by said pump for operating said auxiliary switch and means released by the closing of the auxiliary switch for holding the main switch closed.

82. In combination, a motor, a main switch for the motor, means external to the motor for closing the main switch, a starting resistance, an auxiliary switch for cutting out the starting resistance, a pump driven by the motor at all times and an operating cylinder for the auxiliary switch actuated by the pump.

83. In combination, a motor, a main switch for the motor, means external to the motor for closing the main switch, a starting resistance, an auxiliary switch for cutting out the starting resistance, a pump driven by the motor at all times and an operating cylinder for the auxiliary switch actuated by the pump, and means for opening the auxiliary switch when the pump drops below a given speed.

84. In combination, a motor, a main switch for the motor, means external to the motor for closing the main switch, a starting resistance, an auxiliary switch for cutting out the starting resistance, a pump driven by the motor at all times and an operating cylinder for the auxiliary switch actuated by the pump, and means for opening the auxiliary switch when the pump drops below a given speed, and means actuated by the opening of the auxiliary switch for opening the main switch.

85. In combination, a motor, a main switch for the motor, means external to the motor for closing the main switch and for holding said switch closed for a predetermined time, means for opening the main switch, an auxiliary switch, a starting resistance controlled by the auxiliary switch, means released by the auxiliary switch when in closed position for preventing the opening of the main switch and means dependent upon the speed of the motor for closing the auxiliary switch and holding it closed.

86. In combination, a motor, a main switch, means external to the motor for closing the main switch and for holding said switch closed for a predetermined period of time, means for opening the main switch, an auxiliary switch, a starting resistance controlled by the auxiliary switch, means released by the auxiliary switch when in closed position for preventing the opening of the main switch, a fluid operated cylinder for closing the auxiliary switch and a pump constantly connected to the motor for supplying fluid under pressure to the motor cylinder.

87. In combination, a motor, a main switch, means external to the motor for closing the main switch and for holding said switch closed for a predetermined period of time, means for opening the main switch, an auxiliary switch, a starting resistance controlled by the auxiliary switch, means released by the auxiliary switch when in closed position for preventing the opening of the main switch, a fluid operated cylinder for closing the auxiliary switch and a pump constantly connected to the motor for supplying fluid under pressure to the motor cylinder, a connecting passageway, and a leakage port for the fluid to deplete the pressure in the cylinder to permit the auxiliary switch to open.

88. In combination, a motor, a driven machine, a fluid pump invariably connected to the motor, a fluid pressure cylinder for applying the load of the machine to the motor, a passageway connecting the pump to said cylinder, a leakage port in said passageway, said cylinder having a piston and having an overflow port adapted to be uncovered by the piston when the piston is at the outer end of its stroke, a release valve for the cylinder, and means actuated by inward movement of the piston past the overflow port to open the release valve.

89. In combination, a compressor, a fluid pump connected to the compressor, a loading cylinder for the compressor, a passageway connecting the pump and the cylinder, a leakage port for said passageway, a piston driven outwardly by the pressure of fluid generated by the pump for loading the compressor, and means responsive to predetermined drop in pressure in said cylinder for moving the piston of the cylinder completely inwardly to unload the compressor.

90. In combination, an electric motor, a driven machine for the motor, a main switch for the motor, a starting resistance, an auxiliary switch controlling the starting resistance, a loading device for controlling the loading of the driven machine upon the motor, means for closing the main switch and holding the same closed for a short interval of time only, means energized by the motor and dependent upon a predetermined speed of the motor for closing the auxiliary switch, means controlled by said auxiliary switch for holding the main switch closed and loading means for the driven machine dependent upon a higher predetermined speed, and operable only after the auxiliary switch is closed.

91. In combination, a starting resistance, a switch for the starting resistance, an electric motor, a driven machine, a loading device for loading the driven machine upon the motor, a cylinder for the switch, a cylinder for the loading device and a pump invariably connected to the motor for energizing first the switch cylinder, and second, the loading cylinder.

92. In combination, a driving motor, a driven pump, a main switch for the motor, a starting resistance, an auxiliary switch for the starting resistance, means for normally unloading the pump, fluid pressure operated means for the auxiliary switch, a second fluid pressure operated means for the loading device, and means dependent upon the speed of the driving motor for causing the actuation of the pressure operated means for the auxiliary switch and thereafter the actuation of the pressure controlled means for the unloading device.

93. In combination, a motor, a switch, means for holding the switch closed for a short period of time only, means dependent upon the attainment of a predetermined speed by the motor for holding the switch closed, said last means being actuated upon a reduction in speed of the motor to release the switch, and means tending to open said switch.

94. In combination, a compressor, an unloader for said compressor, a spring for said unloader, a fluid pump driven in unison with the compressor and a piston operated by the fluid pressure from said pump for opposing and overcoming the said spring to cause loading of the compressor.

95. In combination, a compressor, an unloader for the compressor, a spring for said unloader, means driven in synchronism with the compressor for generating a fluid pressure and a piston operated by the fluid pressure for opposing the spring to cause unloading of the compressor and a leakage port for preventing loading until a predetermined speed of the compressor is reached.

96. In combination, a compressor, an unloader for said compressor, a spring for the unloader, means connected to the compressor for generating a fluid pressure, a piston operated by the fluid pressure for opposing the said spring to cause loading of the compressor, a cylinder for the piston, said cylinder having a port which is overrun by the piston when the unloader spring has been overcome by said piston.

97. In combination, a compressor, a main reservoir, a motor, a starting resistance, a main switch for the motor, a starting resistance switch, operating cylinders for said switches, an auxiliary air reservoir charged from the main reservoir, means dependent upon a predetermined minimum pressure in the main reservoir for connecting the auxiliary reservoir to the main switch cylinder, means dependent upon the speed of the compressor for applying pressure to the starting resistance switch cylinder, the main switch cylinder having a leakage port for permitting the pressure of the auxiliary reservoir to leak away and permit opening of the main switch within a given period of time, and a detent for holding the main switch closed so long as the starting resistance switch is closed.

98. In combination, a motor, an air compressor, a switch for the motor, and means controlled jointly by the pressure of the air delivered by the compressor and the speed of the compressor for operating said switch.

99. In combination, an unloader comprising a spring, a cylinder, a piston for opposing said spring, an exhaust valve for the cylinder, means for supplying fluid under pressure to said cylinder, expansible means contained within the cylinder between the piston and the exhaust valve, retrograde movement of the piston being adapted to press upon said expansible means and to open said exhaust valve, said expansible means being collapsed when the exhaust valve is opened.

100. In combination, a cylinder, a spring, a main piston, an admission port for fluid pressure, an exhaust valve, auxiliary pistons adapted to separate when the main piston is forced outwardly and to trap fluid between them, means for forcing the main piston inwardly to engage one of the pistons and to force the exhaust valve open, said cylinder having cooperating ports to permit the discharge of the trapped fluid when the exhaust valve is open.

101. In combination, a motor, a switch for the motor, a pair of pumps driven by the motor, a fluid pressure system individual to each pump, and means controllable by an increase in pressure of one system or by a decrease of pressure of the other system beyond predetermined limits for operating the switch.

102. In combination, a motor, a switch for the motor, a pair of pumps driven by the motor, a fluid pressure system individual to each pump, means controllable by an increase of pressure in one system for causing a decrease in pressure in the other system, and means controlled by decrease of pressure in said other system for opening said switch.

103. In combination, a motor, a switch for the motor, a pair of pumps driven by the motor, a fluid pressure system individual to each pump, means controllable by an increase of pressure in one system for causing a decrease in pressure in the other system, and means controlled by decrease of pressure in said other system for opening said switch, and means responsive to overload condition of the motor for decreasing the pressure in said other system.

104. In combination, a motor, a switch for the motor, a pair of pumps driven by the motor, a fluid pressure system for each pump, means controllable by an increase in pressure of one system or a decrease in pressure of the other system beyond predetermined limits for operating the switch, and means responsive to overload conditions of said motor for causing actuation of said latter means.

105. In combination, a motor, a switch for the motor, means for closing said switch temporarily, means for holding said switch permanently closed, a pump, a fluid pressure system fed by said pump, and a pressure sensitive element controlled by a drop in fluid pressure in said system for releasing said switch holding means.

106. In combination, a motor, a switch for the motor, a pair of pumps driven by the motor, a pressure system for one pump, a pressure system for the other pump, and means controlling the operation of said switch, said means being controllable by the pressure of each system.

107. In combination, a motor, a switch for the motor, an electro responsive element in series relation with the switch, a pump, a pressure system fed by the pump, and means controlled by the pressure in the system and responsive to said element for operating the switch.

108. In combination, a motor, a switch for the motor, a pair of pumps, a pressure system individual to each pump, an electro responsive element in series with the switch and means controllable by both pressure systems and by said element for operating said switch.

109. In combination, a motor, a switch for the motor, an electro responsive element in series relation with the motor, a pump, a pressure system fed by the pump, and means controlled by the pressure in the system and responsive to overload conditions of said element for opening the switch.

110. In combination, a motor, a main switch for the motor, means for holding the switch closed, a fluid pressure system adapted to be maintained under pressure by a predetermined speed of the motor, and means for releasing said holding system by lowering of the pressure of said system.

111. In combination, a motor, a main switch for the motor, means for holding the switch closed, a fluid pressure system adapted to be maintained under pressure by a predetermined speed of the motor, said holding means being released by lowering of the pressure of said system, and means responsive to current drawn by the motor for bleeding the fluid pressure system to cause opening of the main switch.

112. In combination, a motor, a main switch, means for automatically closing the main switch, a starting resistance, a starting resistance cut-out switch, a fluid pressure system having means for closing the cut-out switch, means for holding the main switch closed, said means being active only while the cut-out switch is closed, said fluid pressure system having a pump driven by said motor for providing an operative pressure in said system so long as the motor speed is above a predetermined value.

113. In combination, a motor, a main switch, means for automatically closing the main switch, a starting resistance, a starting resistance cut-out switch, a fluid pressure system having means for closing the cut-out switch, means for holding the main switch closed, said means being active only while the cut-out switch is closed, said fluid pressure system having a pump driven by said motor for providing an operative pressure in said system so long as the motor speed is above a predetermined value, and means responsive to abnormal current flow through the motor for bleeding the pressure in said system.

114. In combination, a motor, a switch for the motor, a switch cylinder for closing the switch, a compressor, a main reservoir, an auxiliary reservoir, a pneumatic governor having a high pressure responsive element and a low pressure responsive element, a governor valve controlled by the high pressure element for connecting the auxiliary reservoir to the main reservoir, and controlled by the low pressure element for connecting the auxiliary reservoir to the switch cylinder, said switch cylinder having a blow down port for depleting the pressure in the auxiliary reservoir and switch cylinder, and a mechanical detent for holding the motor switch closed.

115. In combination, a motor, a switch for the motor, a switch cylinder for closing the switch, a compressor, a main reservoir, an auxiliary reservoir, a pneumatic governor having a high pressure responsive element and a low pressure responsive element, a governor valve controlled by the high pressure element for connecting the auxiliary reservoir to the main reservoir, and controlled by the low pressure element for connecting the auxiliary reservoir to the switch cylinder, said switch cylinder having a blow down port for depleting the pressure in the auxiliary reservoir and switch cylinder, and a mechanical detent for holding the motor switch closed, and means responsive to the pressure in the auxiliary reservoir for releasing said detent.

116. In combination, a motor, a switch for the motor, a switch cylinder for closing the switch, a compressor, a main reservoir, an auxiliary reservoir, a pneumatic governor having a high pressure responsive element and a low pressure responsive element, a governor valve controlled by the high pressure element for connecting the auxiliary reservoir to the main reservoir, and controlled by the low pressure element for connecting the auxiliary reservoir to the switch cylinder, said switch cylinder having a blow down port for depleting the pressure in the auxiliary reservoir and switch cylinder, and a mechanical detent for holding the motor switch closed, and means dependent upon the speed of the motor for applying and releasing said detent.

117. In combination, a motor, a switch for the motor, a switch cylinder for closing the switch, a compressor, a main reservoir, an auxiliary reservoir, a pneumatic governor having a high pressure responsive element and a low pressure responsive element, a governor valve controlled by the high pressure element for connecting the auxiliary reservoir to the main reservoir, and controlled by the low pressure element for connecting the auxiliary reservoir to the switch cylinder, said switch cylinder having a blow down port for depleting the pressure in the auxiliary reservoir and switch cylinder, and a mechanical detent for holding the motor switch closed, a starting resistance for the motor, a cut-out switch responsive to the attainment of a predetermined speed of the motor for cutting out said resistance, said cut-out switch controlling said detent, and means responsive to pressure in the auxiliary reservoir for causing opening of the cut-out switch and release of said detent.

118. In combination, a motor, a switch for the motor, an electro responsive device in series relation with the switch, a pump, a pressure system fed by the pump and means actuated by fluid pressure from the system and controlled by said electro responsive device for operating said switch.

119. In combination, a compressor having an intake valve, means for holding the intake valve out of action, a pump operated in unison with the compressor, a fluid pressure system fed from said pump and being adapted upon the attainment of a predetermined speed of the compressor to build up a desired fluid pressure, a pressure actuated element connected to said system and adapted to be actuated upon the building up of said desired fluid pressure for controlling said holding means to permit the intake valve to act.

120. In combination, a compressor having an intake valve, means for holding the intake valve out of action, a pump operated in unison with the compressor, a fluid pressure system fed from said pump and being adapted upon the attainment of a predetermined speed of the compressor to build up a desired fluid pressure, a pressure actuated element connected to said system and adapted to be actuated upon the building up of said desired fluid pressure for controlling said holding means to permit the intake valve to act, said system having means for releasing pressures in excess of the desired value for higher speeds of the compressor.

121. In combination, a compressor to be loaded and unloaded, a pump driven in unison with the compressor, a fluid pressure system fed by said pump comprising an unloading control cylinder having a loaded piston for controlling the loading and unloading of the compressor, said system having a leakage port for preventing a building up of the required pressure in said cylinder until a predetermined speed of the compressor is attained.

122. In combination, a compressor to be loaded and unloaded, a pump driven in unison with the compressor, a fluid pressure system fed by said pump comprising an unloading control cylinder having a loaded piston for controlling the loading and unloading of the compressor, said system having a leakage port for preventing a building up of the required pressure in said cylinder until a predetermined speed of the compressor is attained, and a leakage port for releasing excessive pressures caused by speeds in excess of said predetermined speed.

123. In combination, a compressor to be unloaded, a pump driven in unison with the compressor, a fluid pressure system fed by the pump comprising a pressure operated element for loading the compressor upon the attainment of a predetermined pressure in said system, means for preventing the attainment of said predetermined pressure in the system until the compressor attains a required speed, and means for preventing the building up of higher pressures upon attainment of more than the required compressor speed.

124. In combination, a compressor, a pump driven in unison with the compressor, a pressure system individual to the compressor, a pressure system individual to the pump, and means controlled by the pressure in each of said systems for unloading said compressor.

125. In combination, a compressor, a pump driven in unison therewith, a pressure system for the compressor, a pressure system for the pump, means controlled by the attainment of a predetermined pressure in the pump pressure system for loading of the compressor and controlled by the attainment of a predetermined pressure in the compressor system for unloading the compressor.

126. In combination, a compressor, a pump driven in unison with the compressor, a fluid pressure system fed by the pump comprising a pressure actuated element for loading the compressor upon the attainment of a predetermined pressure of the fluid in said system, and a quick release valve for evacuating the pressure in said system for unloading the compressor promptly upon a decline in pressure in the fluid system.

127. In combination, a compressor, a pump driven in unison with the compressor, a fluid pressure system fed by the pump, said system comprising a pressure actuated element for loading the compressor, and a quick release valve for said system for promptly unloading the compressor upon a drop in pressure in said system.

128. In combination, a compressor, driving means therefor, a pump driven in unison with the compressor, control means for said driving means, a fluid pressure system fed by said pump, said system comprising a pressure actuated element for said control means, and a quick release valve for promptly releasing the pressure in said system upon a decline in pressure in said system below a desired value.

129. In combination, a compressor, driving means therefor, a pump driven in unison with the compressor, control means for said driving means, a fluid pressure system fed by said pump, said system comprising a pressure actuated element for said control means, means for preventing the building up of the required pressure in said system until said compressor attains a predetermined speed, and a quick release valve for promptly releasing the pressure in said system upon a decline in pressure in said system below a desired value.

130. In combination, a compressor, driving means therefor, a pump driven in unison with the compressor, control means for said driving means, a fluid pressure system fed by said pump, said system comprising a pressure actuated element for said control means, means for preventing the building up of the required pressure in said system until said compressor attains a predetermined speed, a quick release valve for promptly releasing the pressure in said system upon a decline in pressure in said system below a desired value, and means for releasing pressure in said system in excess of the required value.

131. In combination, a positively operated liquid circulating system, yielding means for unloading a compressor, and means actuated by the pressure in said system for rendering said unloading means inactive.

132. In combination, a compressor driving shaft, a pump driven thereby, a liquid circulating system operated by said pump, yielding means for unloading the compressor, and means actuated by pressure in said system for rendering said unloading means inactive.

133. In combination, a compressor, a driving shaft, a pump driven thereby, and means controlled by said pump for loading said compressor when the latter is driven at a predetermined speed.

134. In combination, a compressor, a driving shaft, a pump driven thereby, and means controlled by said pump for unloading said compressor when the speed of the latter is reduced to a predetermined point.

135. In combination, a compressor having a driving shaft, a pump driven thereby, and means controlled by said pump for causing loading of said compressor when it approaches full speed and for effecting unloading thereof when the speed falls substantially below the speed at which loading occurs.

136. In combination, a driving shaft, a compressor cylinder, a compressor piston driven by said shaft, an inlet valve for said cylinder, a pump driven by said shaft, and means controlled by said pump for causing said inlet valve to be held open when said shaft is rotated below a given speed and for permitting said inlet valve to function where said speed exceeds a predetermined rate.

137. In combination, a driving shaft, a compressor connected thereto, a pump driven by said shaft, unloading means for said compressor, means including a pressure actuated member controlling the loading of said compressor, and means for varying the pressure developed by said pump.

138. In combination, a driving shaft, a compressor connected thereto, a pump adapted to be driven at a substantially constant speed by said shaft, means including a pressure actuated diaphragm controlling the loading of said compressor, and means for maintaining a constant pressure on said diaphragm during said constant speed operation of the pump.

139. In combination, a driving shaft, a compressor connected thereto, a pump adapted to be driven at constant speed by said shaft, unloading mechanism for said compressor including a diaphragm controlled by said pump, and means for maintaining a constant circulation through said pump and a constant pressure on said diaphragm during said constant speed operation of said pump.

140. The combination with a fluid compressing means and driving means therefor, of means operative to effect loading of said fluid compressing means when subjected to a fluid pressure variation of a predetermined intensity, and means driven by one of said two first mentioned means for producing the requisite fluid pressure variation at a time when the driving speed of said fluid compressing means reaches a predetermined desired rate.

141. The combination with a fluid compressing means and driving means therefor, of means operative to effect loading of said fluid compressing means when subjected to a fluid pressure variation of a predetermined intensity, means driven by one of said two first mentioned means for producing the requisite fluid pressure variation at a time when the speed of said fluid compressing means reaches a predetermined desired amount, and means governing said pressure variation producing means whereby the requisite fluid pressure variation may be produced at a different driving speed of said fluid compressing means.

142. The combination with a compressor having suction operated inlet valves and mechanism co-operating with said valves for holding them open, of means for controlling said unloading mechanism including a pump driven during running of said compressor.

143. In combination, a compressor having suction operated inlet valves, a driving shaft, a pump driven by said driving shaft, and means controlled by said pump for effecting loading of said compressor when the latter is driven at a predetermined speed.

144. In combination, a compressor having suction operated inlet valves, a driving shaft, a pump driven thereby, and means controlled by said pump for unloading said compressor when the speed of the latter is reduced to a predetermined point.

145. In combination, a power driven compressor, a fluid pump driven with said compressor, a fluid container fed by said pump, means for permitting the escape of fluid so that the pressure of the fluid is dependent upon the speed of the pump, and means dependent upon fluid pressure for controlling the loading of said compressor.

146. In combination, a compressor, a fluid pump connected to said compressor, a chamber having a movable wall, means whereby the movements of said wall control the loading of said compressor, a passageway connecting the pump and chamber, and a leakage port for said passageway of constant area.

147. In combination, a compressor, unloading means for said compressor, and means controlled jointly by the pressure of the air delivered by the compressor and the speed of the compressor and including a pump driven when the compressor is running for controlling the unloading of the latter.

148. In combination, a member adapted to constitute a load for a driving motor, pressure generating means driven with said load constituting means, and means whereby the pressure generated by said pressure generating means causes the application of the load.

149. In combination, driven means adapted to constitute a load for a driving motor, said driven means being operable in loaded or unloaded condition, a pressure generating system driven with said driven means, and means whereby the pressure generated may cause the loading of said driven means upon the lapse of a predetermined interval after the starting thereof.

150. In combination, a compressor having an inlet valve, means for unloading said compressor by holding said inlet valve open, means controlled by the speed of the compressor for loading the compressor, said means comprising a pump driven in unison with the compressor, a hydraulic system fed by the pump, a loading cylinder having a piston moved by pressure from the pump when the compressor operates at a desired speed.

151. In combination, a compressor having an inlet valve, means for unloading said compressor by holding said inlet valve open, means controlled by the speed of the compressor for loading the compressor, said means comprising a pump driven in unison with the compressor, a hydraulic system fed by the pump, a loading cylinder having a piston moved by pressure from the pump when the compressor operates at a desired speed, said hydraulic sytem having means for preventing the building up of pressure in the cylinder until the desired speed is attained.

152. In combination, a compressor having an inlet valve, means for unloading said compressor by holding said inlet valve open, means controlled by the speed of the compressor for loading the compressor, said means comprising a pump driven in unison with the compressor, a hydraulic system fed by the pump, a loading cylinder having a piston moved by pressure from the pump when the compressor operates at a desired speed, said hydraulic system having means for preventing the building up of pressure in the cylinder until the desired speed is attained and having means for relieving pressure in excess of a desired pressure in said system.

153. The combination with a compressor, of a fluid operated unloading mechanism, and controlling means therefor for increasing the exhaust therefrom during the unloading of the compressor without interrupting it.

154. The combination with a compressor, a fluid pressure pipe and fluid pressure operated unloading mechanism, of a compressor controlling means comprising a conduit connecting said pipe and said unloading mechanism, and means in said conduit for controlling a flow of pressure fluid to said unloading mechanism, for maintaining the pressure of the fluid in said mechanism substantially constant during the loading of the compressor, and for providing an accelerated uninterrupted exhaust for the pressure fluid from said mechanism when said compressor is to be unloaded.

155. The combination with a compressor, a fluid pressure pipe and fluid pressure operated unloading mechanism, of a compressor controlling means comprising a conduit connecting said pipe and said unloading mechanism, and means in said conduit for controlling a flow of pressure fluid to said unloading mechanism, for permitting a slow exhausting of pressure fluid from said mechanism during the loading of the compressor, and for automatically accelerating the exhaust of the pressure fluid, without interrupting the same, from said mechanism when said compressor is to be unloaded.

156. In a compressor controlling mechanism the combination of a compressor having one or more inlet valves therefor, a source of fluid pressure maintained during normal operation of the compressor, and a pressure system connected thereto comprising a connection between said source and said valves, pressure actuated mechanism disposed in said connection for actuating said inlet valves, means forming a port in said connection, a fluid pressure operated valve for said port, a constantly open bleeder port for said connection and a quick releasing valve for said system for depleting the pressure in said pressure actuated mechanism upon a predetermined drop of pressure therein.

157. In combination, a compressor having an intake valve, a receiver therefor, an unloader cylinder for the intake valve, a pressure main for said unloader cylinder, an exhaust valve for said unloader cylinder, a pressure operated device actuated by air from the receiver for opening the exhaust valve, and a quick release valve for said unloader cylinder.

158. A compressor having an inlet valve, an unloader cylinder having a source of fluid pressure connected thereto, a leakage port for said cylinder, and a quick release valve for rapidly depleting the pressure in said cylinder when the pressure drops below a predetermined value.

In witness whereof, I hereunto subscribe my name this 6th day of December, 1923.

BURTON S. AIKMAN.

DISCLAIMER

Reissue Patent No. 16,041.—*Burton S. Aikman*, Whitefish Bay, Wis. CONTROL SYSTEM FOR COMPRESSORS AND THE LIKE. Patent dated April 7, 1925. Disclaimer filed August 8, 1930, by the assignee, *National Brake & Electric Company*, the patentee, said *Aikman*, concurring.

Hereby enters this disclaimer to those claims which are in the following words:

"133. In combination, a compressor, a driving shaft, a pump driven thereby, and means controlled by said pump for loading said compressor when the latter is driven at a predetermined speed.

"134. In combination, a compressor, a driving shaft, a pump driven thereby, and means controlled by said pump for unloading said compressor when the speed of the latter is reduced to a predetermined point.

"135. In combination, a compressor having a driving shaft, a pump driven thereby, and means controlled by said pump for causing loading of said compressor when it approaches full speed and for effecting unloading thereof when the speed falls substantially below the speed at which loading occurs.

"136. In combination, a driving shaft, a compressor cylinder, a compressor piston driven by said shaft, an inlet valve for said cylinder, a pump driven by said shaft, and means controlled by said pump for causing said inlet valve to be held open when said shaft is rotated below a given speed and for permitting said inlet valve to function where said speed exceeds a predetermined rate."

"138. In combination, a driving shaft, a compressor connected thereto, a pump adapted to be driven at a substantially constant speed by said shaft, means including a pressure actuated diaphragm controlling the loading of said compressor, and means for maintaining a constant pressure on said diaphragm during said constant speed operation of the pump.

"139. In combination, a driving shaft, a compressor connected thereto, a pump adapted to be driven at constant speed by said shaft, unloading mechanism for said compressor including a diaphragm controlled by said pump, and means for maintaining a constant circulation through said pump and a constant pressure on said diaphragm during said constant speed operation of said pump.

"140. The combination with a fluid compressing means and driving means therefor, of means operative to effect loading of said fluid compressing means when subjected to a fluid pressure variation of a predetermined intensity, and means driven by one of said two first mentioned means for producing the requisite fluid pressure variation at a time when the driving speed of said fluid compressing means reaches a predetermined desired rate.

"141. The combination with a fluid compressing means and driving means therefor, of means operative to effect loading of said fluid compressing means when subjected to a fluid pressure variation of a predetermined intensity, means driven by one of said two first mentioned means for producing the requisite fluid pressure variation at a time when the speed of said fluid compressing means reaches a predetermined desired amount, and means governing said pressure variation producing means whereby the requisite fluid pressure variation may be produced at a different driving speed of said fluid compressing means.

"142. The combination with a compressor having suction operated inlet valves and mechanism cooperating with said valves for holding them open, of means for controlling said unloading mechanism including a pump driven during running of said compressor.

"143. In combination, a compressor having suction operated inlet valves, a driving shaft, a pump driven by said driving shaft, and means controlled by said pump for effecting loading of said compressor when the latter is driven at a predetermined speed.

"144. In combination, a compressor having suction operated inlet valves, a driving shaft, a pump driven thereby, and means controlled by said pump for unloading said compressor when the speed of the latter is reduced to a predetermined point.

"145. In combination, a power driven compressor, a fluid pump driven with said compressor, a fluid container fed by said pump, means for permitting the escape of fluid so that the pressure of the fluid is dependent upon the speed of the pump, and means dependent upon fluid pressure for controlling the loading of said compressor.

"146. In combination, a compressor, a fluid pump connected to said compressor, a chamber having a movable wall, means whereby the movements of said wall control the loading of said compressor, a passageway connecting the pump and chamber, and a leakage port for said passageway of constant area.

"147. In combination, a compressor, unloading means for said compressor, and means controlled jointly by the pressure of the air delivered by the compressor and the speed of the compressor and including a pump driven when the compressor is running for controlling the unloading of the latter.

"148. In combination, a member adapted to constitute a load for a driving motor, pressure generating means driven with said load constituting means, and means whereby the pressure generated by said pressure generating means causes the application of the load.

"149. In combination, driven means adapted to constitute a load for a driving motor, said driven means being operable in loaded or unloaded condition, a pressure generating system driven with said driven means, and means whereby the pressure generated may cause the loading of said driven means upon the lapse of a predetermined interval after the starting thereof."

[*Official Gazette, August 26, 1930.*]